United States Patent [19]
Aosaki et al.

[11] Patent Number: 5,220,436
[45] Date of Patent: Jun. 15, 1993

[54] ELECTRONIC COPYING MACHINE

[75] Inventors: Ko Aosaki; Yasuhiro Nishitani; Yoji Naka; Seiji Takada, all of Tokyo, Japan

[73] Assignee: Fuji Photo Film Co., Ltd., Kanagawa, Japan

[21] Appl. No.: 784,657

[22] Filed: Oct. 28, 1991

Related U.S. Application Data

[63] Continuation of Ser. No. 466,147, Jan. 16, 1990, abandoned.

[30] Foreign Application Priority Data

| Jan. 13, 1989 | [JP] | Japan | 1-6758 |
| Jan. 17, 1989 | [JP] | Japan | 1-7938 |
| Jan. 20, 1989 | [JP] | Japan | 1-11462 |
| Jan. 20, 1989 | [JP] | Japan | 1-11463 |
| Jan. 20, 1989 | [JP] | Japan | 1-11464 |
| Feb. 1, 1989 | [JP] | Japan | 1-23053 |
| Feb. 27, 1989 | [JP] | Japan | 1-46210 |

[51] Int. Cl.$^5$ .............. H04N 1/40; H04N 1/04
[52] U.S. Cl. .................... 358/401; 358/474
[58] Field of Search .......... 358/474, 475, 479, 482, 358/486, 487, 488, 489, 491, 493, 494, 497, 473, 495, 401, 468, 496; 250/235, 236

[56] References Cited

U.S. PATENT DOCUMENTS

| 4,626,925 | 12/1986 | Toyoda | 358/494 |
| 4,736,251 | 4/1988 | Sasaoko | 358/494 |
| 4,807,041 | 2/1989 | Kishi et al. | |
| 4,812,913 | 3/1989 | Knop et al. | 358/474 |
| 4,907,091 | 3/1990 | Yoshida et al. | 358/474 |
| 4,939,588 | 7/1990 | Ushiro et al. | 358/401 |
| 5,067,028 | 11/1991 | Ogura et al. | 358/494 |

Primary Examiner—Edward L. Coles, Sr.
Assistant Examiner—Jerome Grant, II
Attorney, Agent, or Firm—Young & Thompson

[57] ABSTRACT

An electronic copying machine for making a hard copy of a remote surface has a taking lens for forming an image of the remote surface and an image sensor which scans the image to provide video signals. The electronic copying machine is provided with a scanning area projecting device for projecting a frame onto the remote surface which defines an area of the image of the remote surface to be scanned. The scanning area projecting device comprises a frame slit plate formed with a plurality of frame slits for forming different sizes of slit frame images, a masking plate for selectively masking the frame slits and a source of illumination for illuminating the slit plate so as to project onto the remote surface a frame image of a size selected by the masking plate.

14 Claims, 24 Drawing Sheets

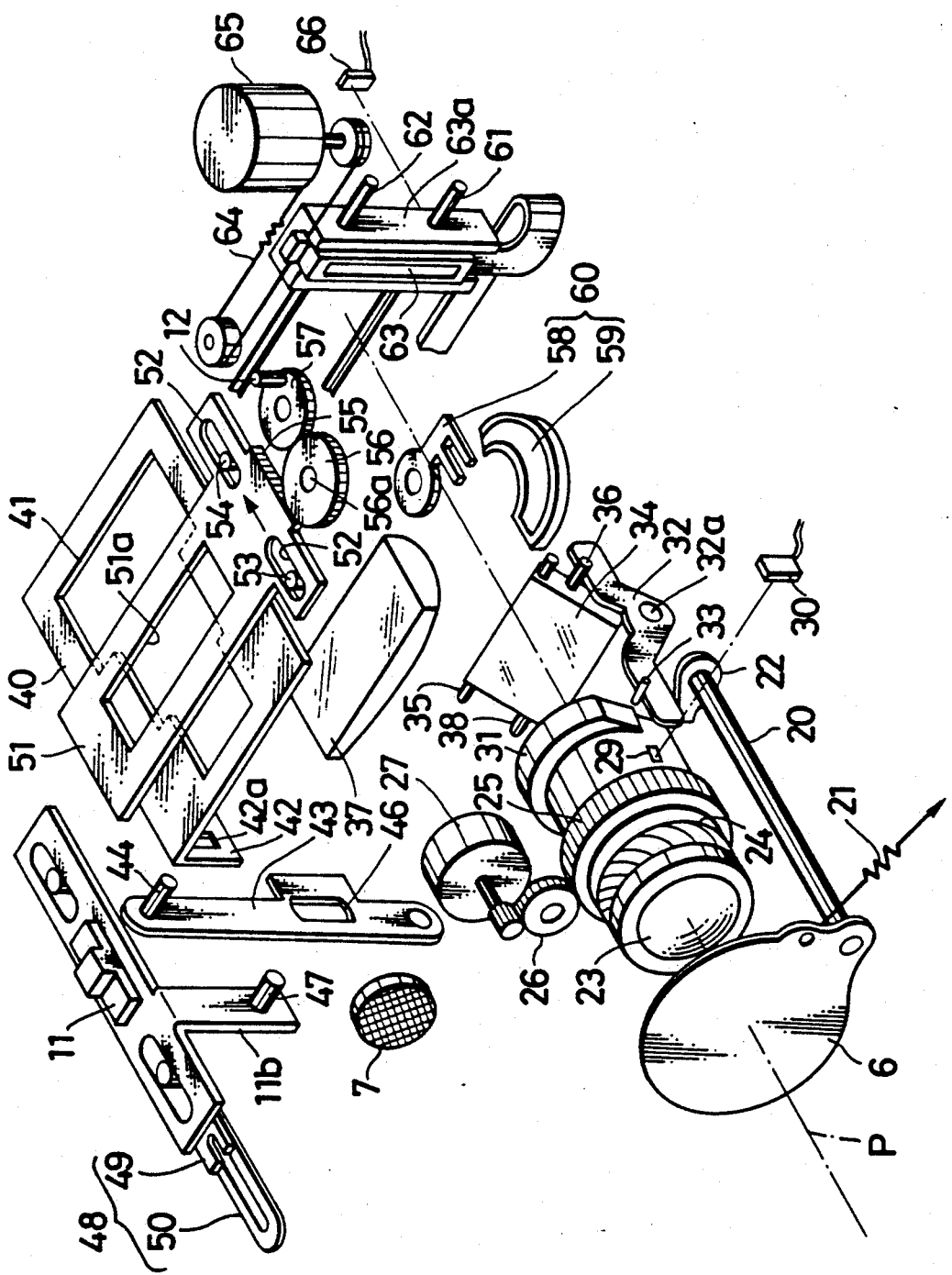

F I G. 5
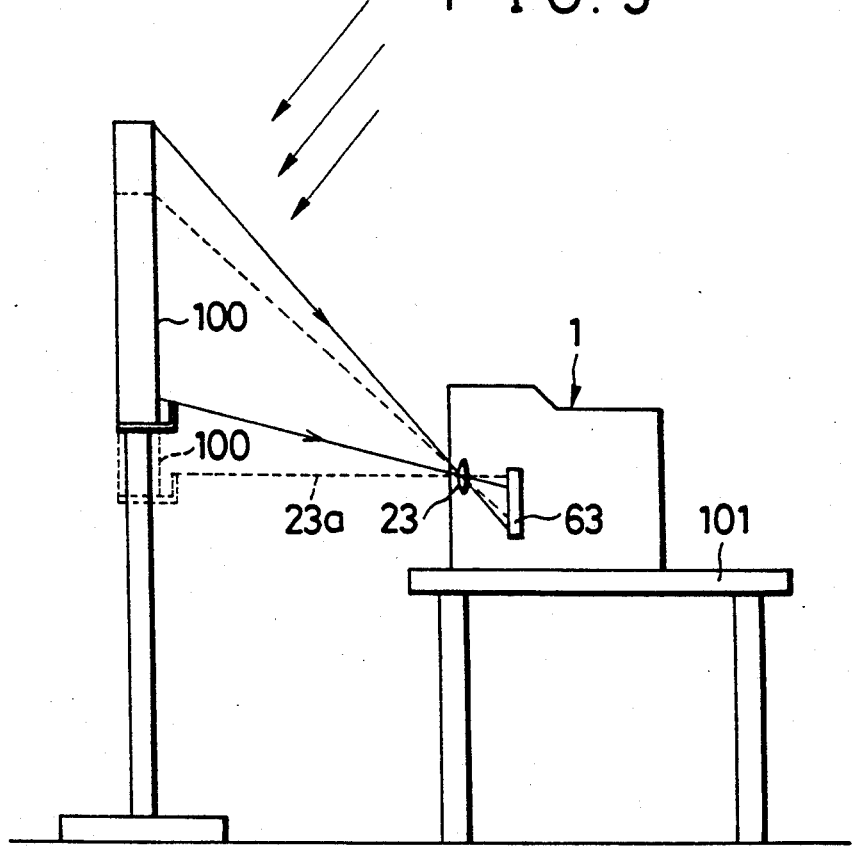

F I G. 10
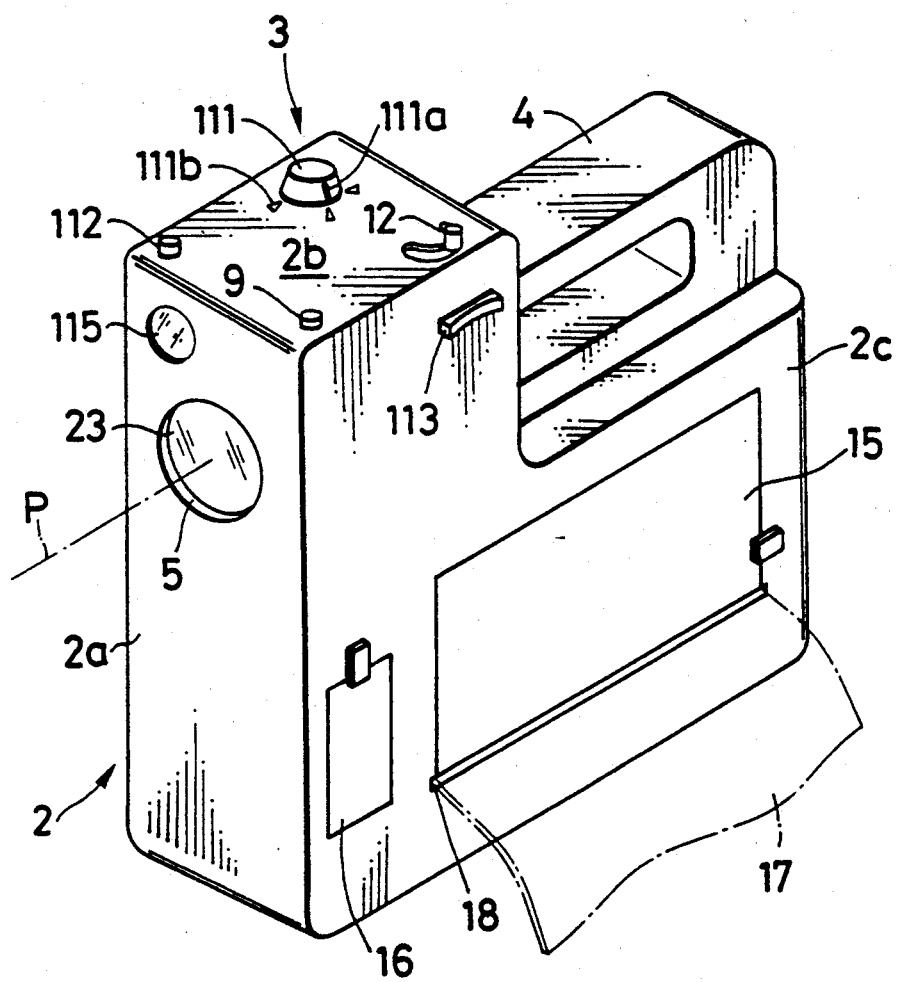

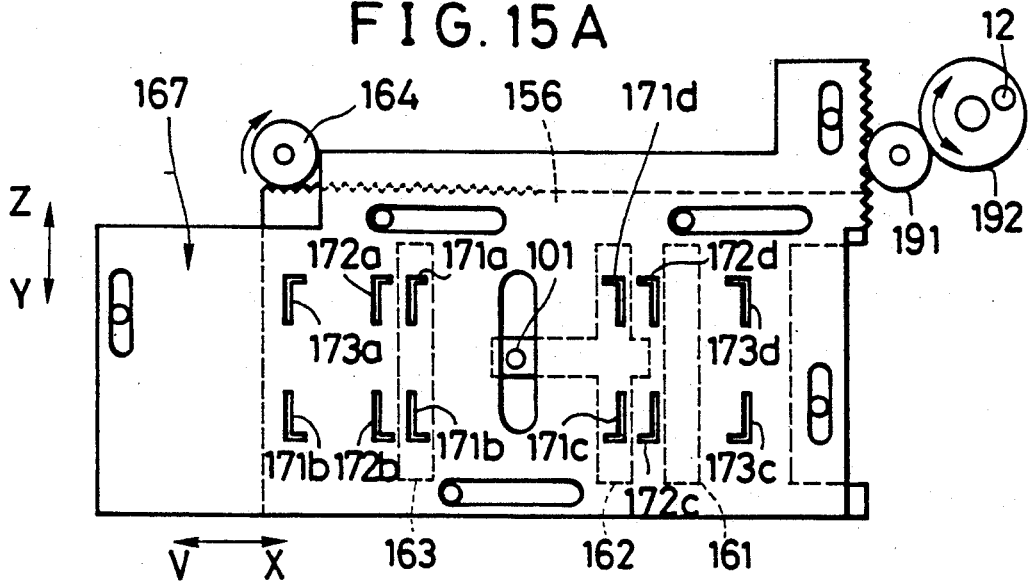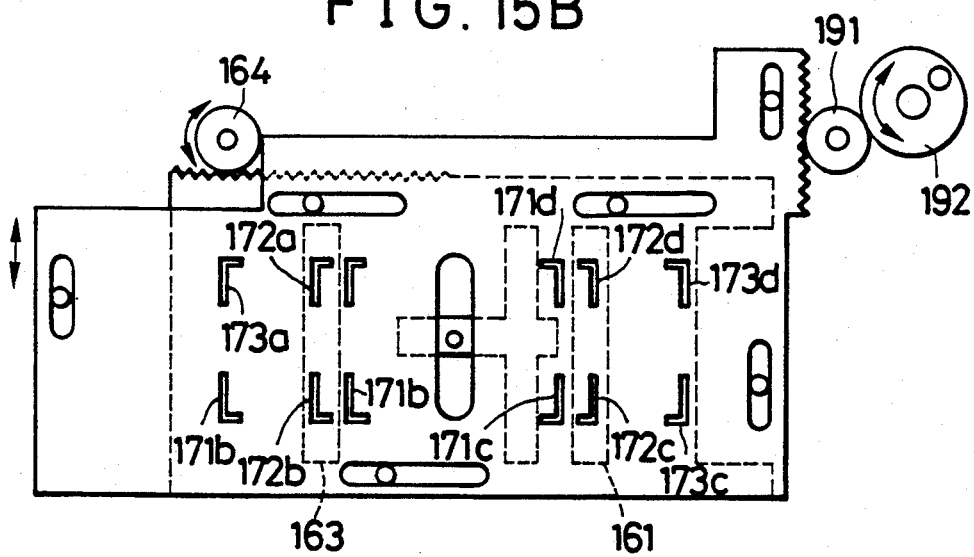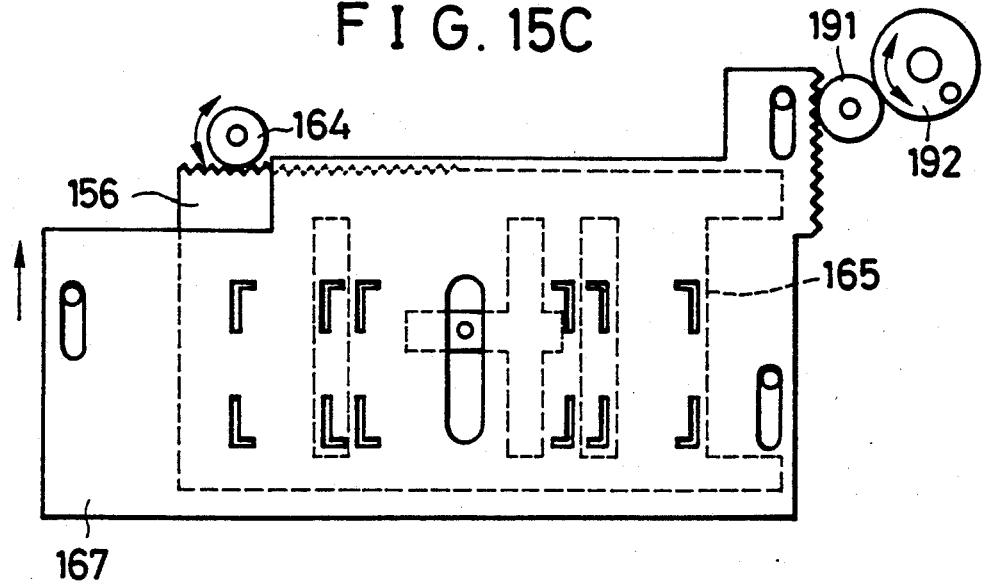

F I G. 25
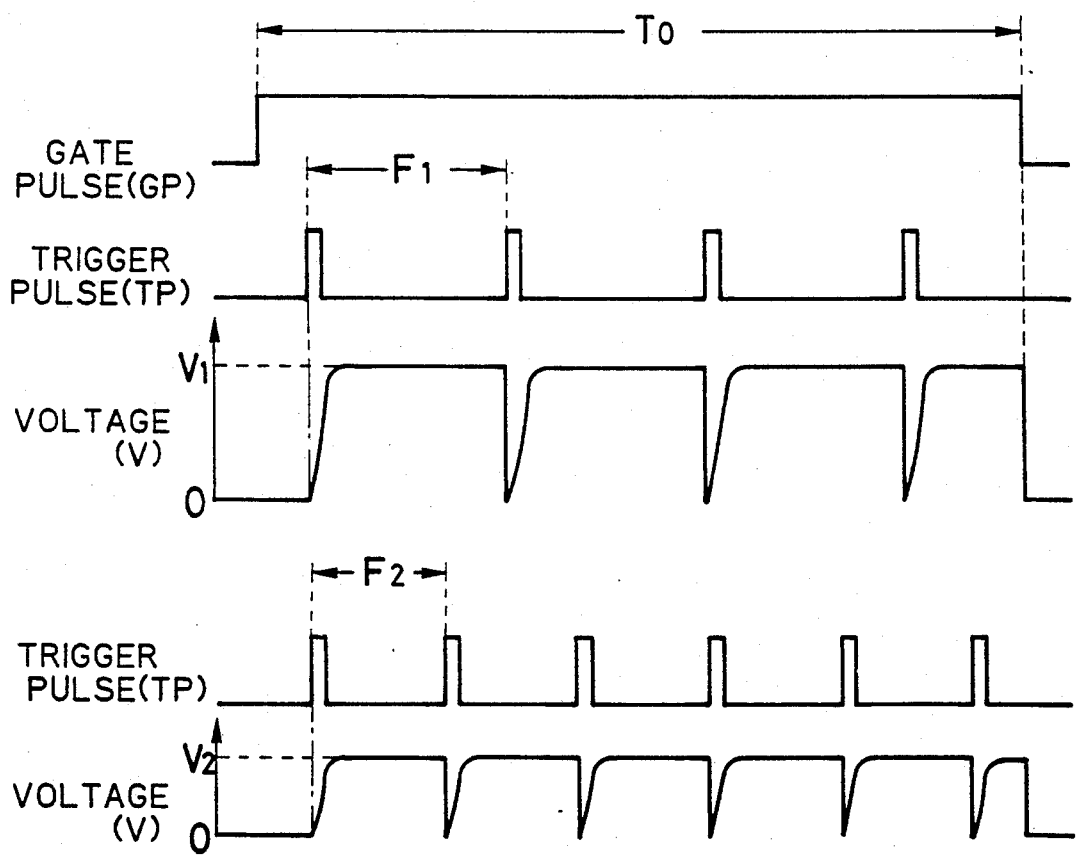

ELECTRONIC COPYING MACHINE

This application is a continuation of application Ser. No. 07/466,147, filed Jan. 16, 1990, now abandoned.

BACKGROUND OF THE INVENTION

The present invention relates to an electronic copying machine for making a hard copy of the images present on a remote surface such as a writing board.

In recent years, there have been developed electronic copying machines capable of making a hard copy of notes, illustrations or the like written on a writing board either directly or on a sheet placed on or tacked to the writing board, which consist of a video camera and a printer assembled as an integral unit. In one such electronic copying machine, an image of a selected part of the remote surface is optically formed on an image sensor, such as a charge coupled device (CCD), of the video camera and converted into video signals. A printing head of the printer is driven by or according to the video signals, to print the image on a copy paper.

Such electronic copying machines are often used on a table or desk. Because tables or desks and writing boards are usually different in height, an electronic copying machine disposed on a table is not always capable of forming an image of the whole surface of the writing board. To make it possible to cover the whole surface of the writing board, it has been proposed that the electronic copying machine be placed on a table in such a way as to incline the optical axis of the image forming optical system upward at a proper angle relative to the surface of the writing board. This, however, leads to the so-called keystone effect in the copied image. That is, the image of the surface of the writing board formed by the electronic copying machine thus placed on the table has disproportionate vertical magnification relative to horizontal magnification. To eliminate this keystone effect, the electronic copying machine should be displaced vertically so as to dispose the optical axis of the image forming optical system perpendicular to the surface of the writing board. This leads to a somewhat troublesome adjustment of an electronic copying machine disposed on a table, with respect to the writing board.

In one known type of copying machine described in Japanese Unexam. Patent Publ. No. 58-162942, an optical viewfinder is used to observe an area of a remote surface to be copied. In another known type of electronic copying machine described in Japanese Unexam. Patent Publ. No. 58-69173, an electronic viewfinder system including a CRT (cathode ray tube) or an LCD (liquid crystal display) is used to display an image of a remote surface, which is scanned by an image sensor to produce image data which is stored in a digital form in a memory, and defines an area to be copied. In these electronic copying machines, it is quite troublesome to define an area to be copied by viewing the optical or electronic viewfinder. Further, the electronic viewfinder makes the electronic copying machine not only expensive but also bulky and heavy.

OBJECTS OF THE INVENTION

It is, therefore, an object of the present invention to provide an electronic copying machine which makes it quite easy to define an area of a remote surface to be copied thereby.

It is another object of the present invention to provide an electronic copying machine which is neither expensive nor heavy.

SUMMARY OF THE INVENTION

These and other objects of the present invention are realized by an electronic copying machine for making a hard copy of the images present on a remote surface, comprising an image forming assembly having a taking lens system for forming an image of the remote surface, a scanner for scanning the image to provide video signals, and a scanning area projector adapted to project a frame onto the remote surface to define an area of the remote surface to be scanned by the scanner. The scanning area projector comprises a frame slit plate formed with a plurality of frame slits for forming different sizes of slit frame images, a masking plate for selectively masking the frame slits and a source of illumination for illuminating the slit plate so as to project a frame image of a size selected by the masking plate onto the remote surface. The scanning area projector includes a shifter for shifting the slit frame plate back and forth and the masking plate right and left so as to select a desired size of the slit frame to be projected as a frame image.

BRIEF DESCRIPTION OF THE DRAWINGS

The above and other objects, features and advantages of the present invention will be fully understood from the following description taken by way of preferred embodiments thereof with reference to the accompanying drawings, in which similar parts are designated by the same reference numerals throughout the drawings of views and wherein:

FIG. 2 is an exploded perspective view showing the interior mechanism of the electronic copying machine shown in FIG. 1;

FIG. 5 is an illustration showing the electronic copying machine of the present invention disposed on a table, and being used to make a hard copy of a remote surface;

FIG. 10 is a perspective view of an electronic copying machine according to another preferred embodiment of the present invention;

FIG. 15A is an illustration showing the positional relationship of the masking plate and frame slit plate of the frame projecting device of the electronic copying machine shown in FIG. 10 in which a small size frame is formed on a center part of the remote surface;

FIG. 15B is an illustration showing the positional relationship of the masking plate and frame slit plate of the frame projecting device of the electronic copying machine shown in FIG. 10 in which a medium size frame is formed on a center part of the remote surface;

FIG. 15C is an illustration showing the positional relationship of the masking plate and frame slit plate of the frame projecting device of the electronic copying machine shown in FIG. 10 in which the medium size frame is formed on an upper part of the remote surface;

FIG. 25 is a time chart of signals provided by the control circuitry of FIG. 24;

DETAILED DESCRIPTION OF THE INVENTION

Figure 1:
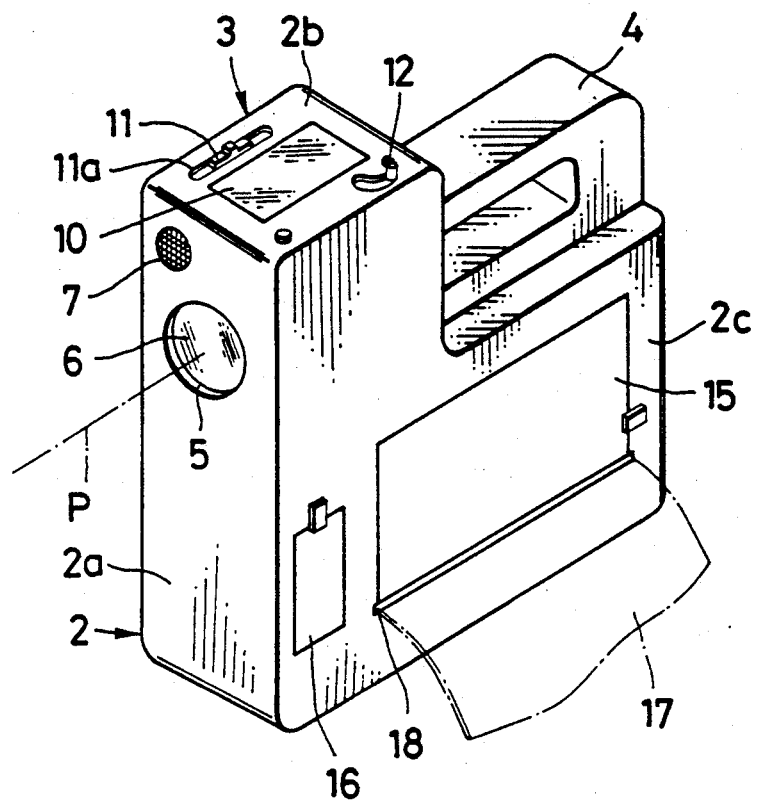
FIG. 1 is a perspective view of an electronic copying machine according to a preferred embodiment of the present invention.
Figure 3:
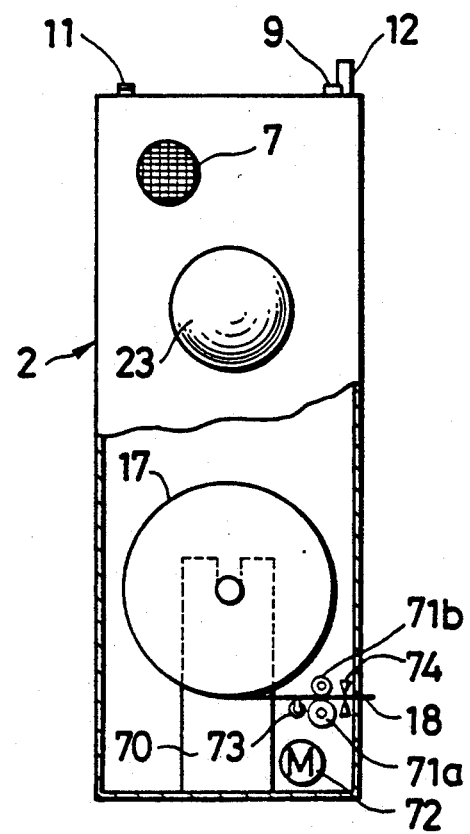
FIG. 3 is a front view, partially cut away, of FIG. 1.

Referring now to FIGS. 1 to 3, an electronic copying machine according to a preferred embodiment of the present invention, suitable for making a hard copy of, for example a writing board remote therefrom, comprises a thin or flat generally parallelepipedal housing 2 with an upper right or rear quarter portion cut away. An upper left or front quarter portion of the housing 2 forms an image forming housing section 3. An integral handgrip 4 is formed in the cut-away portion for carrying convenience. The housing 2 has an exposure opening 5 defined by a hole formed in an upper portion of the front wall 2a thereof. A transparent lens cover 6, which is made of plastic, is pivotally mounted on the front wall 2a in the housing 2 so as to open and close the exposure opening 5, keeping dust and foreign particles from entering the housing 2 and protecting the taking lens system 23 from being scratched.

An ultrasonic generator 7 of an ultrasonic auto-focus device, which is of a well known type, is provided and is disposed in the housing 2 above the exposure opening 5. The ultrasonic autofocus device generates ultrasonic waves and directs them forwardly and, upwardly at an angle of approximately 10° with respect to the optical axis P of the taking lens system 23 and receives the ultrasonic waves reflected by a subject, i.e. the surface of a writing board remote therefrom, to measure the distance between the copying machine and the writing board.

The top wall 2b of the housing 2 is provided with a release button 9 and a viewfinder screen 10. The top wall 2b is formed with a straight slot 11a and an arcuate slot 12a on opposite sides of the finder screen 10, which receive a copy width change lever 11 and a copy height adjusting knob 12, respectively, which will be described in detail later.

One side wall 2c of the housing 2 is provided with a paper loading door 15 hinged thereto along its front edge and an access door 16 which is smaller in size than the paper loading door 15 and is hinged along its lower edge to the housing 2. The paper loading door 15 is opened to load a roll of thermosensitive copy paper 17 as a recording paper in a printer unit located in the housing 2 adjacent to the paper loading door 15. The thermosensitive copy paper 17 can be withdrawn through a paper slit 18 formed in the side wall 2c along the lower side of the paper loading door 15. The access door 16 is opened for access to a control panel with various switches, such as a power switch, a print mode selector switch, a density change switch, etc., all of which are well known in the art.

Details of the internal structure of the electronic copy machine are shown in FIG. 2. The transparent lens cover 6 is fixed to the front end of a rotatable connecting shaft 20 and urged by means of a spring 21 to turn in the clockwise direction. The rotatable connecting shaft 20 has a detent 22 secured to the rear end thereof. A lens barrel 24 holding the taking lens system 23 is supported for rotation in the housing 2 behind the transparent lens cover 6. The lens barrel 24 has an external ring gear 25 integrally formed therewith or fixedly mounted thereon. The lens barrel 24 is operationally coupled to a pulse motor 27 through an idler gear 26 in mesh with the external ring gear 25, so that rotation of the pulse motor 27 is transmitted to the lens barrel 24. As will be described in detail later, the pulse motor 27 is controlled by means of the ultrasonic autofocus device. A photosensor 30, which is laterally spaced from the lens barrel 24, is provided in the housing 2 to detect a light reflective signaling member 29 attached to the outer surface of the lens barrel 24. The photosensor 30 can detect light reflected from the signaling member 29 when the lens barrel 24 is at its initial position shown in FIG. 2.

The lens barrel 24 further has a ring cam 31 integrally formed with or fixedly mounted on the rear end portion thereof. The peripheral cam surface of the ring cam 31 is in slidable contact with a cam follower pin 33 secured to a front upper edge of a mirror drive lever 32 pivotally mounted on a shaft 32a. The front under edge of the mirror drive lever 32 is in continuous engagement with the detent 22 of the rotatable connecting shaft 20 which, as previously stated, is urged in the clockwise direction. The rear end of the mirror drive lever 32 is in engagement with a follower pin 36 laterally projecting from a quick return reflex mirror 34 which is pivotally mounted on a shaft 35. The reflex mirror 34, when placed in the optical path at 45°, reflects and directs light from the taking lens system 23 upward at a right angle. A condenser lens 37 is disposed directly above the reflex mirror 34. So as accurately to direct light reflected by the reflex mirror 34 toward the condenser lens 37, the reflex mirror 34 is restrictively stopped with a stopper pin 38 so as to be held at 45° with respect to the optical axis P of the taking lens system 23.

Above the condenser lens 37, a black framing mask 40 is slidably mounted for movement in a direction parallel to the optical axis P of the taking lens system 23. The framing mask 40 is formed with an opening 41 of which the inner width varies stepwise according to the widths of standard writing boards, for example 90 cm, 120 cm and 180 cm. The framing mask 40 is integrally formed with a side wall 42 having a slot 42a, the side wall 42 being bent downward at a right angle. Laterally spaced from the framing mask 40 is a swingable lever 43. A pin 44 secured to an upper end portion of the swingable lever 43 is received in the slot 42a of the side wall 42 of the framing mask 40. The swingable lever 43 has therein a longitudinal hole or slot 46 at its middle portion. The longitudinal slot 46 receives a pin 47 projecting laterally inwardly from a bent down portion 11b of the copy width change lever 11. When moving the copy width change lever 11 forward or backward in the direction parallel to the optical axis P, the framing mask 40 is correspondingly slid forward or backward. The copy width change lever 11 is provided with a potentiometer 48 cooperating therewith. The potentiometer 48 comprises a slide contact 49 secured to the under surface of the copy width change lever 11 and a variable resistance 50 in slidable contact with the slide contact 49.

A framing mask 51 which has a transparent viewing area is slidably mounted in slide over the framing mask 40 in a direction parallel to the optical axis P of the taking lens system 23. The framing mask 51 is formed with a rectangular opening 51a having a width equal to the widest portion of the opening 41 of the framing mask 40, which corresponds for example to the width of the 180 cm standard writing board. The framing mask 51 is further formed with a pair of slots 52 extending parallel to the optical axis P and a rack 55 on one side. Fixed guide pins 53 are received one in each of the slots 52 for guiding the axial movement of the framing mask 51. The rack 55 is in mesh with a gear 56 which is in turn in mesh with a gear 57 on which the copy height adjusting knob 12 is eccentrically mounted. A potentiometer 60, which comprises a slide contact brush 58 and a variable resistance segment 59, is provided in cooperation with the gear 56. The slide contact brush 58 has a forked contact end in slidable contact with the resistance segment 59 which latter is a circular arc. Contact 58 is fixedly mounted on a shaft 56a of the gear 56.

Spaced behind the reflex mirror 34 are a pair of horizontal parallel guide shafts 61 and 62. The guide shafts 61 and 62 slidably support an image-reading means such as a line sensor 63 comprising a large number of photoconversion elements arranged vertically in a sensor frame 63a. The sensor frame 63a is operationally connected to a stepping motor 65 by a wire 64. When the stepping motor 65 rotates, the line sensor 63 is moved transversely along the guide shafts 61 and 62. The line sensor 63 has, for example in this embodiment, 2048 photoconversion elements arranged vertically. That is, the 1st to 2048th photo-detecting elements are closely arranged from the lower end of the line sensor 63 to the top end. The line sensor 63 is detected at its initial or starting position shown in FIG. 2 from which it moves to the left as viewed in FIG. 2, by way of a reflective type photosensor 66 located behind the line sensor 63.

Referring to FIG. 3, the printing unit located in the housing 2 adjacent to the paper loading door 15 is shown, having a stand 70 rotatably supporting a core rod 17a on which the thermosensitive copy paper 17 is wound in a roll. The thermosensitive copy paper 17 is withdrawn and directed toward the paper slot 18 by a drive roller 71a driven by a stepping motor 72, and a pinch roller 71b. A thermal printing head 73 is so disposed between the stand 70 and the drive roller 71a as to contact the under surface of the thermosensitive copy paper 17. A cutter 74 is disposed beyond the rollers 71a and 71b to cut off a printed part of the thermosensitive copy paper 17 and release it through the slot 18 out of the housing 2.

Figure 4:
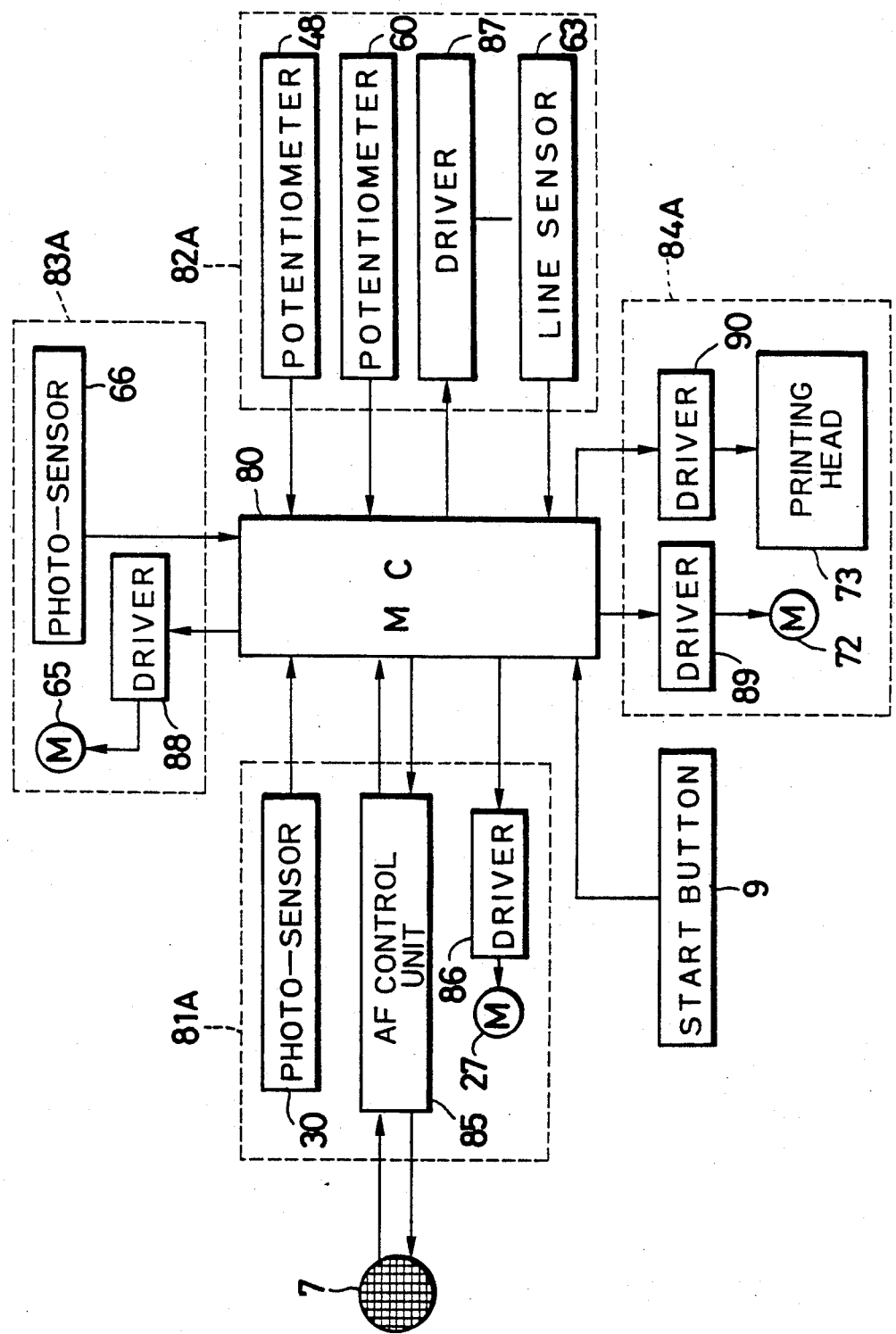
FIG. 4 is a block diagram showing the control circuitry incorporated in the electronic copying machine shown in FIG. 1.

The operational structure of the electronic copying machine depicted in FIGS. 1 to 3 is best understood from FIG. 4, which diagrammatically illustrates the operating elements. A microcomputer 80 (which will be referred to hereafter simply as an MC) controls the operation of various units, such as an autofocus control unit 81A (referred to hereafter as the AF unit), an image sensor control unit 82A, an image sensor drive unit 83A, and a print control unit 84A.

The AF unit 81A includes the photosensor 30 for detecting the lens barrel 24 at its initial position, and the pulse motor 27 (described previously) associated with a driver circuit 86 connected to the MC 80. The AF unit 81A also includes the ultrasonic autofocus device (which will be hereinafter referred to as an AF controller) 85 interconnected between the ultrasonic generator 7 and the MC 80. The MC 80 receives a signal representing the subject distance measured by the AF controller 85 and a signal representing subject brightness from the photosensor 30 and controls the pulse motor 27 as to the amount of rotation and the direction of rotation based on the received signals.

The image sensor unit 82A includes the potentiometers 48 and 60, the line sensor 63 and a driver 87 for driving the line sensor 63, all of which are connected to the MC 80. The MC 80 receives a signal from the potentiometer 48 to determine or specify the limits of movement of the line sensor 63 and a signal from the potentiometer 60 to render certain of the 2048 photoconversion elements active for image reading. For example, if the upper position of the surface of a standard writing board 100 is to be copied by the electronic copying machine 1, as shown by a solid line in FIG. 5, the lower consecutive 1600 photoconversion elements, the 1st to the 1600th, are made effective for specifically defining an image reading area of the writing board 100 in the vertical direction. On the other hand, if the lower position of the surface of the writing board 100 is to be copied by the electronic copying machine 1 as shown by chain lines in FIG. 5, the upper consecutive 1600 photoconversion elements, from the 449th to the 2048th, are made effective for specifically defining an image reading area of the writing board 100.

The image sensor drive unit 83A includes the photosensor 66 and a driver 88 for driving the stepping motor 65. The photosensor 66 and the driver 88 are separately connected to the MC 80. The driver 88 receives pulses from the MC 80 to determine the number of stepwise rotations and the direction of rotation of the stepping motor 65, thereby controlling the movement of the line sensor 63 along the horizontal guide shafts 61 and 62. A signal from the photosensor 66 is used to verify that the line sensor 63 is at its starting or initial position.

The printing head 84A includes the stepping motor 72 and the thermal printing head 73 connected to the MC 80 through drivers 89 and 90, respectively. The MC 80 causes the stepping motor 72 and the thermal printing head 73 to operate simultaneously with the driving of the line sensor 63 to read an image so as to form a thermal image on the thermosensitive copy paper 17. When the line sensor 63 terminates image reading, the thermal printing head 73 stops its operation. After a certain period of time from the stoppage of operation of the thermal printing head 73, the stepping motor 72 is stopped.

To make a hard copy of notes, illustrations or the like written on the writing board 100 directly or on a sheet placed on or tacked to the writing board 100, the electronic copying machine 1 of the present invention is put on a table or desk 101 in front of the writing board 100 (see FIG. 5). The surface of the writing board 100 is viewed through the finder screen 10 for framing a desired area to be copied. After opening the access side door 16 and turning on the power switch, the copy width change lever 11 is slid to turn the swingable lever 43 via the pin 47, causing a sliding movement of the framing mask 40 in engagement with the pin 44 of the swingable lever 43 in a direction parallel to the optical axis P of the taking lens system 23 so that one of the stepped portions of the opening 41 of the framing mask 40 corresponds to the width of the writing board 100. The selected position of the copy width change lever 11 is detected by the MC 80 based on an output of the potentiometer 48.

The copy height adjusting knob 12 is then operated to turn the gears 56 and 57 so as to shift the framing mask 51 in a direction parallel to the optical axis P of the taking lens system 23. If the electronic copying machine 1, having previously been adjusted suitably for making a copy of the writing board 100 at a usual position of use as shown by solid lines at FIG. 5, needs to be readjusted suitably for making a copy at a lower position of the writing board 100 as shown by dotted lines, the copy height adjusting knob 12 is operated so as to rotate the gear 57 in the counterclockwise direction and therefore the gear 56 in the clockwise direction, thereby shifting the framing mask 51 backward or toward the line sensor 63. The clockwise rotation of the gear 56 is followed by a clockwise sliding movement of the slide contact 58 along the resistance segment 59. This results in a decreased level of output from the potentiometer 60.

When the release button 9 is depressed, the ultrasonic generator 7 directs ultrasonic waves toward the writing board 100 and receives the ultrasonic waves reflected by the surface of the writing board 100. The AF controller 85 of the AF unit 81A detects the subject distance of the writing board 100 based on the reflected ultrasonic waves and outputs a distance signal to the MC 80. The MC 80 actuates the driver 86 so as to start the clockwise rotation of the pulse motor 27, thus rotating the lens barrel 24 to focus the taking lens system 23 on the writing board 100. At the beginning of rotation of the lens barrel 24 for focusing, the ring cam 31 forces the cam follower pin 33 sideways, turning the mirror drive lever 32 in the counterclockwise direction to swing up the reflex mirror 34 associated with the rear end of the mirror drive lever 32 as well as to open the lens cover 6 associated with the front end of the mirror drive lever 32.

Upon the lens barrel 24 being turned and the lens system 23 being focused so as to form an image of the writing board 100 in a focal plane, the MC 80 stops the pulse motor 27. Simultaneously therewith, the stepping motor 65 starts rotating in the clockwise direction, thus shifting the line sensor 63 from the starting position to the left to scan the focal plane in which the image of the writing board 100 is formed.

While traveling in the focal plane, the line sensor 63 outputs image signals from the consecutive 1600 designated photoconversion elements, which were rendered active by the MC 80, at intervals according to outputs from the potentiometer 48, and sends them to the MC 80. The MC 80 causes the driver 90 to drive the thermal printing head 73 according to the image signals. Simultaneously with driving the thermal printing head 73, the MC 80 causes also the driver 89 to drive the stepping motor 72, rotating the drive roller 71a so as to forward the thermosensitive copy paper 17 toward the paper slot 18. The thermal printing head 73 thus prints an image of the writing board 100 on the thermosensitive copy paper 17, line by line.

Because the height of an area of the writing board 100 to be copied can be changed by operating the copy height adjusting knob 12 without tilting the electronic copying machine 1 by means of some adjuster, such as a liner or a book (see FIG. 6), the electronic copying machine 1 is stable on the table and an image formed on the line sensor 63 is unaffected by any vibrations of the stepping motors 65 and 72 and the drive roller 71, so that an image of the writing board 100 can be copied without blurring.

At the end of reading an image of the writing board by the line sensor 63, the MC 80 causes the stepping motor 65 to rotate in the counterclockwise direction so as to return the line sensor 63 to the start position. The photosensor 66 detects the line sensor 63 at the start position and outputs a signal to the MC 80 to cause the driver 88 to stop the rotation of the stepping motor 65.

Simultaneously with the counterclockwise rotation of the stepping motor 65, the MC 80 causes the pulse motor 27 to rotate in the counterclockwise direction, turning the lens barrel 24 in the counterclockwise direction toward the start position. During the counterclockwise movement of the lens barrel 24, the ring cam 31 releases the cam follower pin 33, allowing the lens cover 6 to close the taking lens system 23 by the action of spring 21. The closing movement of the lens cover 23 causes the mirror drive lever 32 to turn in the clockwise direction via the connecting shaft 20 and detent 22, thus causing the reflex mirror 34 to swing down. The photosensor 30 detects the lens barrel 24 at the start position and outputs a signal to the MC 80 to cause the driver 86 to stop the rotation of the pulse motor 27. After printing, MC 80 maintains the stepping motor 72 in rotation for a certain period of time. When the stepping motor 72 stops, the cutter 74 is actuated to cut off the printed part of the thermosensitive copy paper 17.

Figure 8:
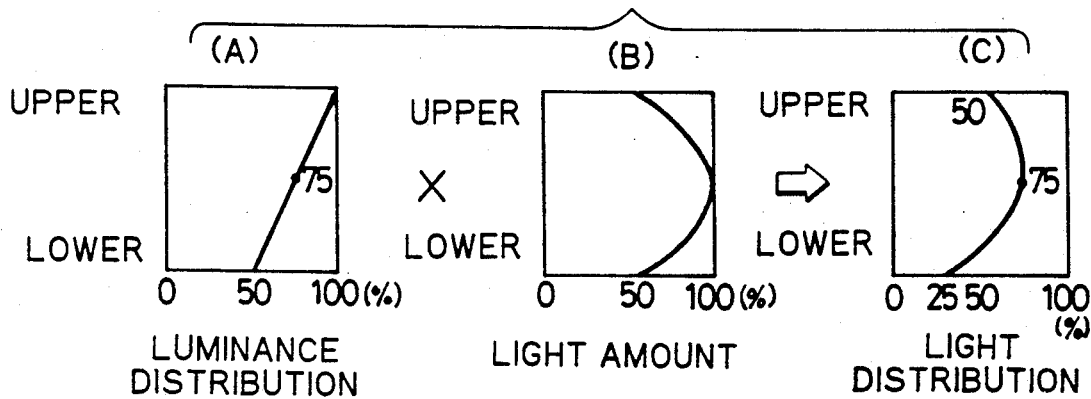

In general, the surface of a writing board is usually illuminated by ceiling lighting. The luminance distribution is therefore different between upper and lower parts of the surface of the vertically disposed writing board. For example, as shown in FIG. 8A, letting the luminance of the upper part of the surface of the writing board be 100, the luminance of the lower part of the surface of the writing board is perhaps lowered to approximately 50. Furthermore, the distribution of light passed through the taking lens system is different between the edge and center of the taking lens system. For example, as shown in FIG. 8B, letting the amount of light passed through the center of taking lens system be 100, the amount of light passed through the edge of the taking lens system is perhaps approximately 50.

Figure 6:
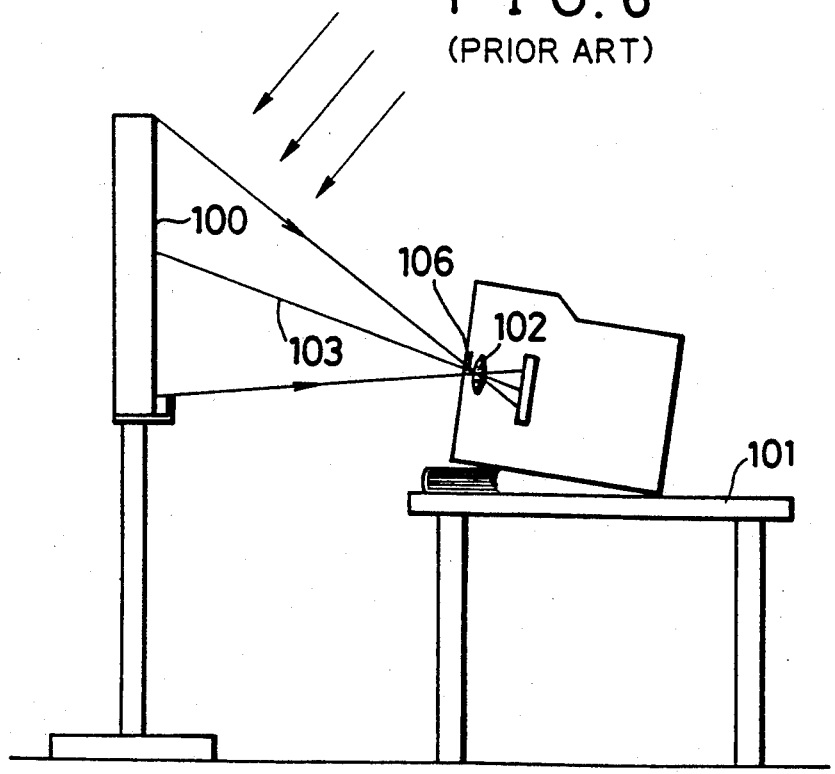
FIG. 6 is an illustration showing a conventional electronic copying machine disposed on a table, and being used to make a hard copy of the remote surface.
Figure 9:
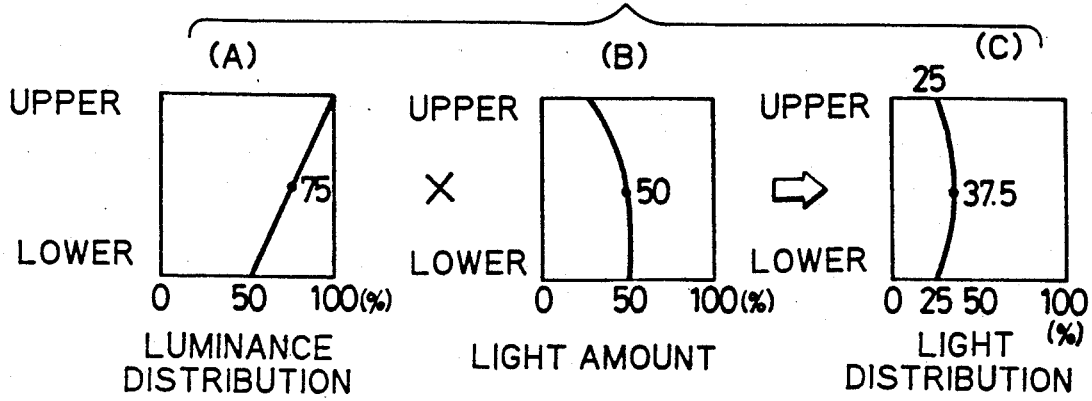

When the conventional electronic copying machine is tilted as shown in FIG. 6 to copy an image of the whole area of the surface of the writing board 100 using the full effective aperture of the taking lens system 102, the optical axis of the taking lens system 103 must be directed to the center of the writing board 101. Accordingly, the brightness of the image field, which is defined by the product of illuminance of the writing board and the amount of light passing through the taking lens system, will be distributed as shown in FIG. 8C. Because of this, it is necessary to correct the brightness distribution of the image field in order to make a hard copy with an even density over the copy. To regulate the amount of light passing through the taking lens system, and thereby to produce a hard copy of uniform image density, there is used either a filter 106 with a density gradient or an electrical correction means in which brightness correction data for all picture elements are memorized in a memory. In the mechanical case, the filter 106 is put in front of the taking lens system 102 as shown in FIG. 6 to control the distribution of light passing through the taking lens system 102. The resulting distribution is shown, for example, in FIG. 9B wherein the ratio of upper, middle and lower portions in amount of light is 25:50:50, which results in the image field brightness distribution as shown in FIG. 9C which is more uniform over the image field as compared to the brightness distribution shown in FIG. 8C. However, although the use of the filter 106 makes the distribution of brightness more uniform over the image field, the level of brightness over the image field is substantially lowered.

Figure 7:
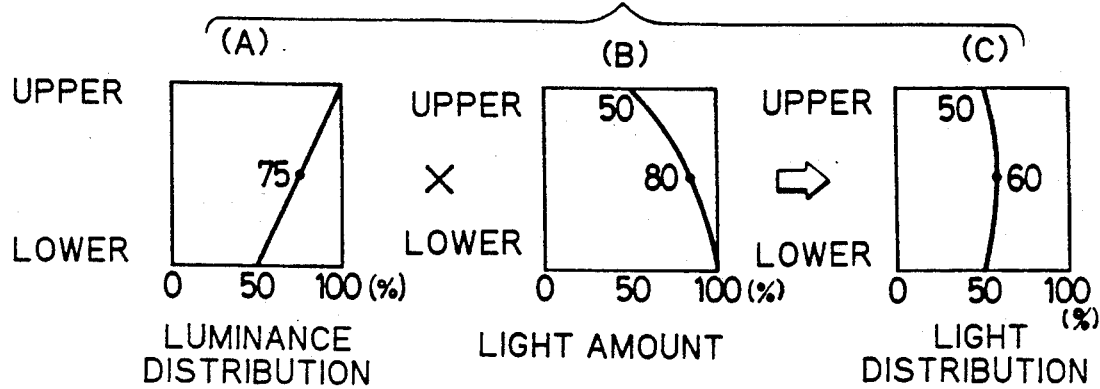
FIGS. 7A, 8A and 9A are graphs showing a brightness distribution of the remote surface.
FIGS. 7B, 8B and 9B are graphs showing a light transmittance of the taking lens.
FIGS. 7C, 8C and 9C are graphs showing a light distribution in an image plane of the electronic copying machine.

In the electronic copying machine according to the present invention (see FIG. 5), because the electronic copying machine 1 is placed on the table 101 with the optical axis 23a of the taking lens system 23 directed horizontally and uses light passed through the upper half of the taking lens system 23, the brightness of the image field is 50 in the upper half and 100 in the lower half as shown in FIG. 7B, even though the copying conditions are the same as the case described previously. If copying the surface of the writing board 100 with its upper half having a luminance of 100 and its lower half having a luminance of 50 as shown in FIG. 7A, the resulting image field brightness distribution is as shown in FIG. 7C. It is apparent from a comparison of the image field brightness distribution shown in FIG. 7C to that shown in FIG. 9C, that the electronic copying machine 1 according to the invention makes a hard copy whose brightness and density are more uniform than a hard copy made by a conventional electronic copying machine in which the amount of light is mechanically regulated.

Referring to FIGS. 10 to 13, an electronic copying machine in accordance with another preferred embodiment of the present invention is shown, which is capable of projecting a copying area. In this embodiment, parts or mechanisms similar to those of the previous embodiment are designated by the same reference numerals and will not be described again herein.

An electronic copying machine according to this embodiment of the present invention is provided with a copy width change knob 111 having an index 111a and a framing button 112 in the top wall 2b of the housing 2, and a frame projecting button 113 in the side wall 2c. The copy width change knob 111 is turned to align the index 111a with any one of indication marks 111b so as stepwise to select one of three different copy widths. In place of the ultrasonic automatic focusing device of the previous embodiment, an active type automatic focusing device is incorporated in the electronic copying machine. The automatic focusing device comprises a lens 115, a light sensor 116 for receiving light reflected from the writing board 100 to provide a distance signal, and an automatic focus detecting unit 85 connected to the light sensor 116. Such an active type automatic focusing device is well known in the art. Designated by a reference numeral 113 is a switch for projecting a frame mark which will be described in detail later.

Figure 12:
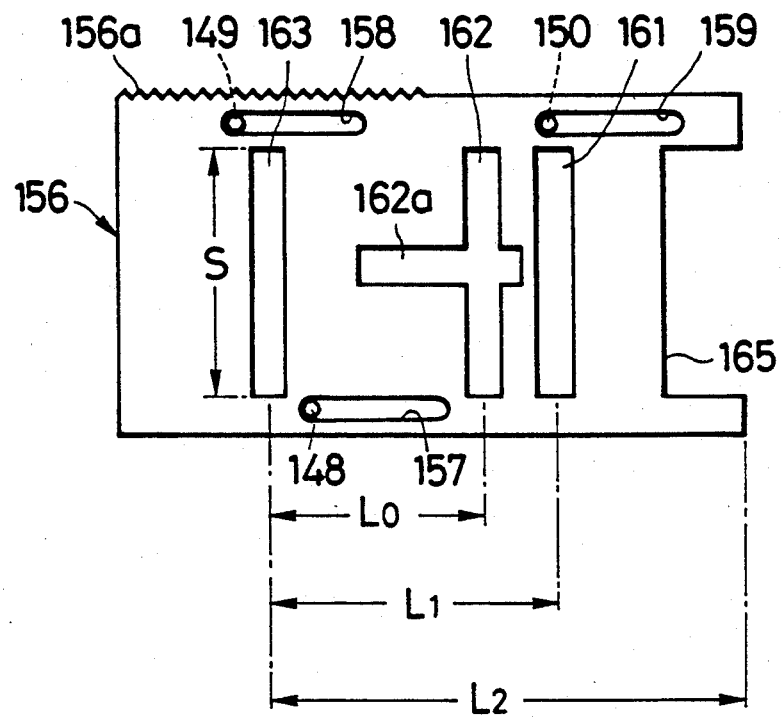
FIG. 12 is a plan view of a masking plate of a frame projecting device of the electronic copying machine shown in FIG. 10.
Figure 13:
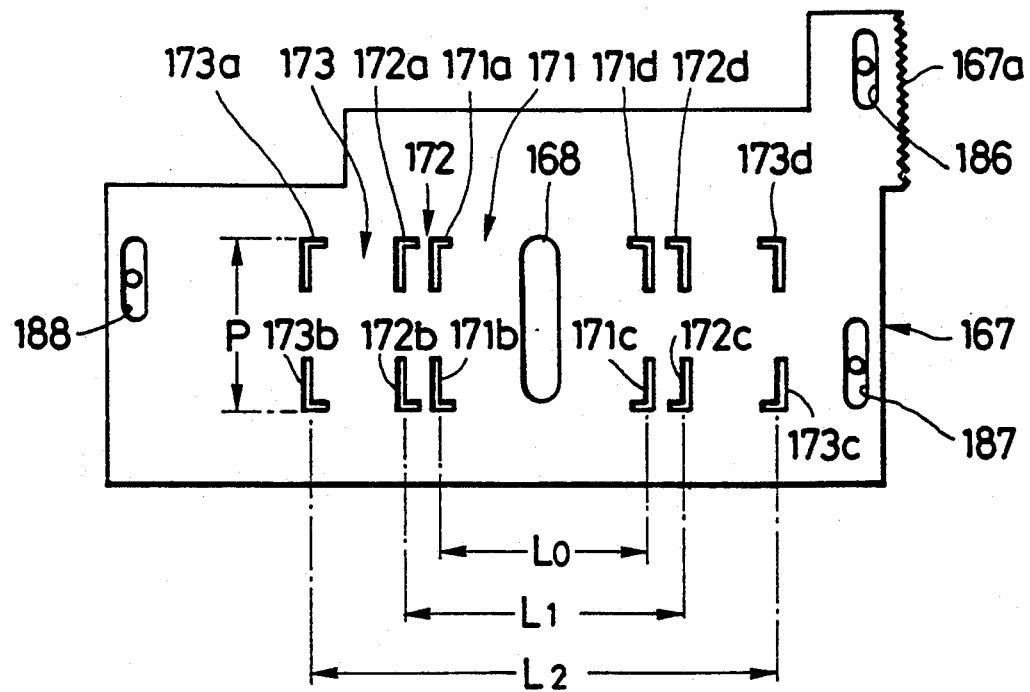
FIG. 13 is a plan view of a frame slit plate of the frame projecting device of the electronic copying machine shown in FIG. 10.

Disposed above the reflex mirror 34 is an aperture plate 146 formed with an aperture opening 147. The aperture plate 146, which is provided with six pins extending upwardly therefrom, three guide pins 152-154 taller than the other guide pins 148-150, slidably supports thereon a masking plate 156 and a frame size change plate 167, forming a frame size changing assembly. As shown in FIG. 12, the masking plate 156 is formed with three guide slots 157-159 for slidably receiving the shorter guide pins 148-150 of the aperture plate 146, respectively, three copy width change slots 161-163 and a generally U-shaped cutaway 165. The copy width change slots 161-163 are so located that the distance $L_0$ between the copy width change slots 162 and 163 is shorter than the distance ($L_1$) between the copy width change slots 161 and 163. The copy width change slot 163 is located at a distance $L_2$ from the edge of the masking plate 156. All of the copy width change slots 161-163 and the U-shaped cutaway 165 have a same height S. Accordingly, as will be described in detail later, the copy width change slots 161-163 can selectively change a copy width in three steps. The copy width change slot 162 between copy width change slots 161 and 163 is formed with an extension slot 162a halfway along its height S, through which light is projected toward a subject via the reflex mirror 34 and the taking lens system 23.

The masking plate 156 is supported for sliding movement in a V-X direction (shown by an arrow in FIG. 11) by means of pin (148-150)-slot (157-159) engagement. To cause the sliding movement of the masking plate 156, the masking plate 156 is formed with teeth 156a in mesh with a gear 164 secured to the copy width change knob 111. The angle through which the copy width change knob 111 turns is detected as a digital signal by means of an encoder 121 attached to the copy width change knob 111.

The frame size change plate 167 (see FIG. 13), which is located in a focal plane of the taking lens system 23, is formed with a central light projecting slot 168 and three, namely large, medium and small, slit frames 171-173 which have the same height P less than the height S of the frame size select slots 161-163 and the U-shaped cutaway 165, but which are different in width from one another. Each slit frame 171, 172, 173 is centered at the middle of the light projection slot 168. The slit frames 171, 172 and 173 consist of four frame slits 171a-171d, 172a-172d and 173a-173d, respectively. The widths are $L_0$, $L_1$ and $L_2$ for the slit frames 171, 172 and 173, respectively. The frame size change plate 167 is also formed with three guide slots 186-188 for slidably receiving the taller guide pins 152-154, respectively. By means of the slot (186-188)-pin (152--154) engagement, the frame size change plate 167 is slidable in a Y-Z direction (shown by an arrow in FIG. 11). To cause the sliding movement of the frame size change plate 167, the frame size change plate 167 is formed with teeth 167a in mesh with an idler gear 191 meshed with a gear 192 secured to the copy width adjusting knob 12. The angle through which the idler gear 191 is turned by the copy width adjusting knob 12 is detected as a digital signal by means of an encoder 122 attached to the gear 192.

Figure 16A:
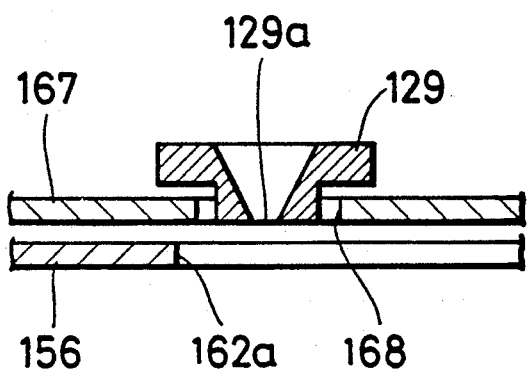
FIG. 16A is a cross sectional view of a center part of the frame slit plate of FIG. 13.
Figure 16B:
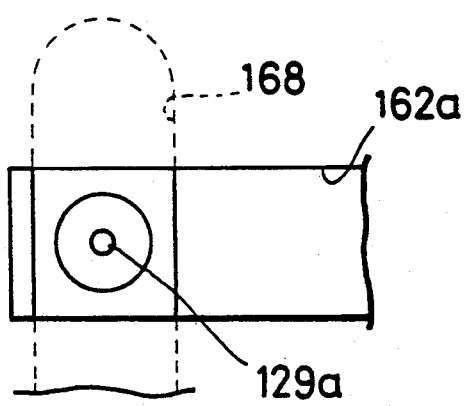
FIG. 16B is a plan view of the center part of the frame slit plate of FIG. 13.

A reflector 124 having an elliptical reflective surface and provided with a xenon lamp 125 as a projection light source extending on a straight line through the focal points of the elliptical surface, is held by a holder 126 disposed just above the frame size change plate 167. The holder 126 is formed with an opening 127 divided into two apertures 127a and 127b by means of a partition 129. The partition 129 is formed with a pin hole 129a for projecting therethrough the light from the xenon lamp 125 as an AF target spot onto the writing board 100. As shown in detail in FIGS. 16A and 16B, the pin hole 129a is tapered and is so formed that the bottom of the pin hole 129a is flush with a lower surface of the frame size change plate 167.

Figure 17:
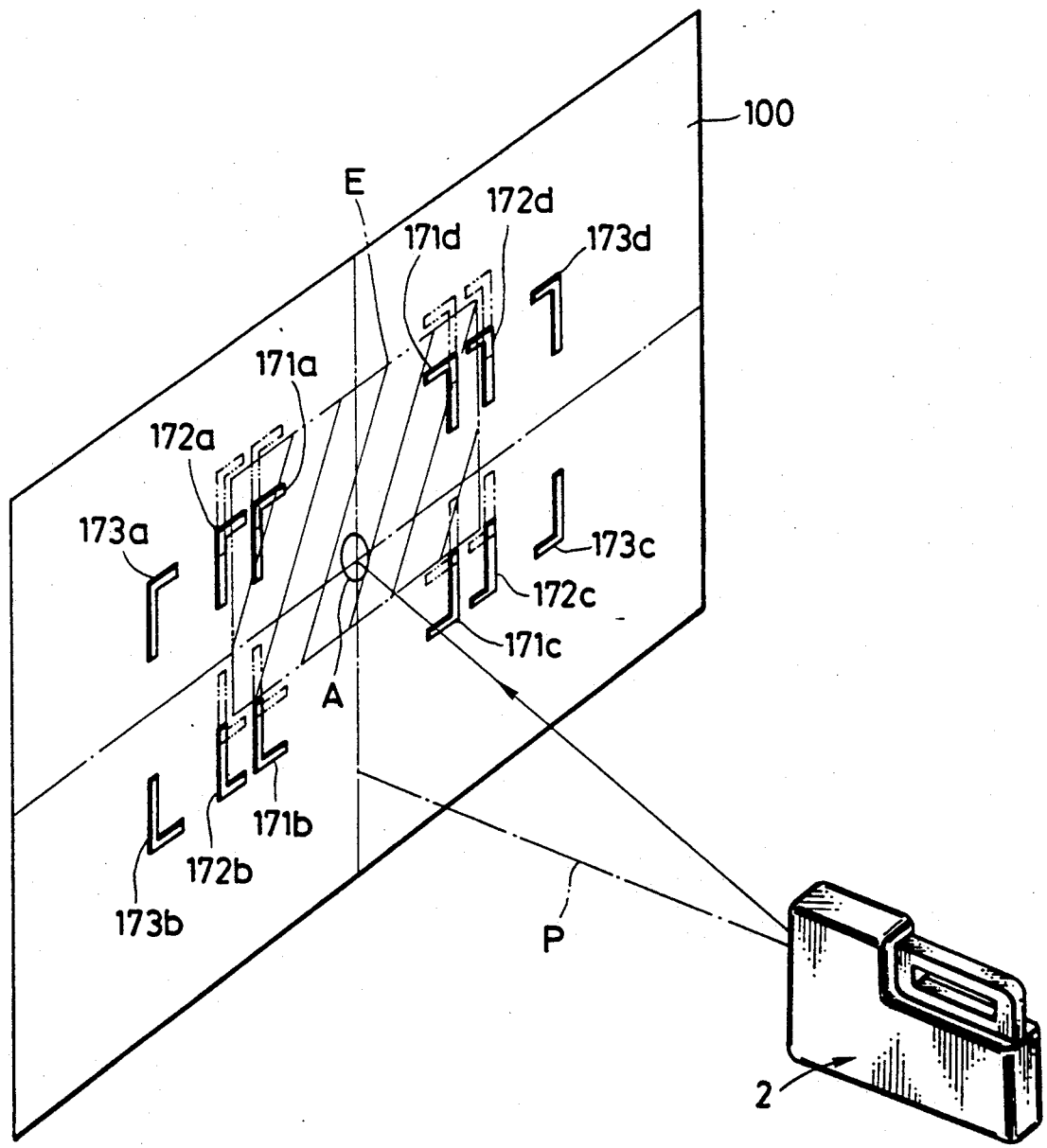
FIG. 17 is an illustration showing the electronic copying machine of FIG. 10 as it would be disposed on a table, and being used to make a hard copy of the remote surface.

Light emanating from the xenon lamp 125 and reflected by the elliptical reflector 124, after passing through the pin hole 129a formed in the partition 129, is reflected at a right angle by the reflex mirror 34 and projected as an AF target mark A in the form of a spot onto the writing board 100. On the other hand, light emanating from the xenon lamp 125 and reflected by the elliptical reflector 124, after passing through the frame slits 171a-171d, 172a-172d and 173a-173d of the respective slit frames 171, 172 and 173 forms frame images F1, F2 and F3 on the writing board 100. The AF target mark A and frame images F1-F3 are illustrated in FIG. 17.

Referring to FIGS. 15A to 15C, when the masking plate 156 and frame size change plate 167 are in a relative position shown in FIG. 15a, the frame slits 171a and 171b, 171c and 171d of the smallest slit frame 171 overlie the frame size select slots 163 and 162, respectively. Accordingly, a light image of the smallest slit frame 171 formed by the masking plate 156 and frame size change plate 167 is projected as the frame image F1 onto the writing board 100, thereby to locate a small size of effective copy area on the writing board 100. When the masking plate 156 is displaced in the V-X direction with respect to the frame size change plate 167 by turning the copy width change knob 111 so as to be in a relative position shown in FIG. 15B, the frame slits 172a and 172b, 172c and 172d of the medium slit frame 172 overlie the frame size select slots 163 and 161, respectively. Accordingly, a light image of the medium slit frame 172 formed by the masking plate 156 and frame size change plate 167 is projected as the frame image F2 onto the writing board 100, thereby to locate a medium size of effective copy area on the writing board 100. In the same manner, the masking plate 156 may be further displaced in the V-X direction with respect to the frame size change plate 167 by turning the copy width change knob 111 such that the frame slits 173a and 173b, 173c and 173d of the large slit frame 173 overlie the frame size select slot 163 and cutaway 165, respectively. In this case, a light image of the large slit frame 173 formed by the masking plate 156 and frame size change plate 167 will be projected as the frame image F3 onto the writing board 100, thereby to locate the largest size of effective copy area on the writing board 100.

If it is desired to shift upwardly any of the frame images F1-F3, the copy adjusting knob 12 is turned to shift forwardly the frame size change plate 167 as shown in FIG. 15C. That is, turning the copy height adjusting knob 12 causes the frame size change plate 167 to be shifted in the Y-Z direction, thereby shifting the frame image F1, F2 or F3 upwardly on the writing board 100, while maintaining the width thereof. Shaded and designated by a reference character E in FIG. 17 is the medium size of effective copy area shifted upwardly.

Figure 14:
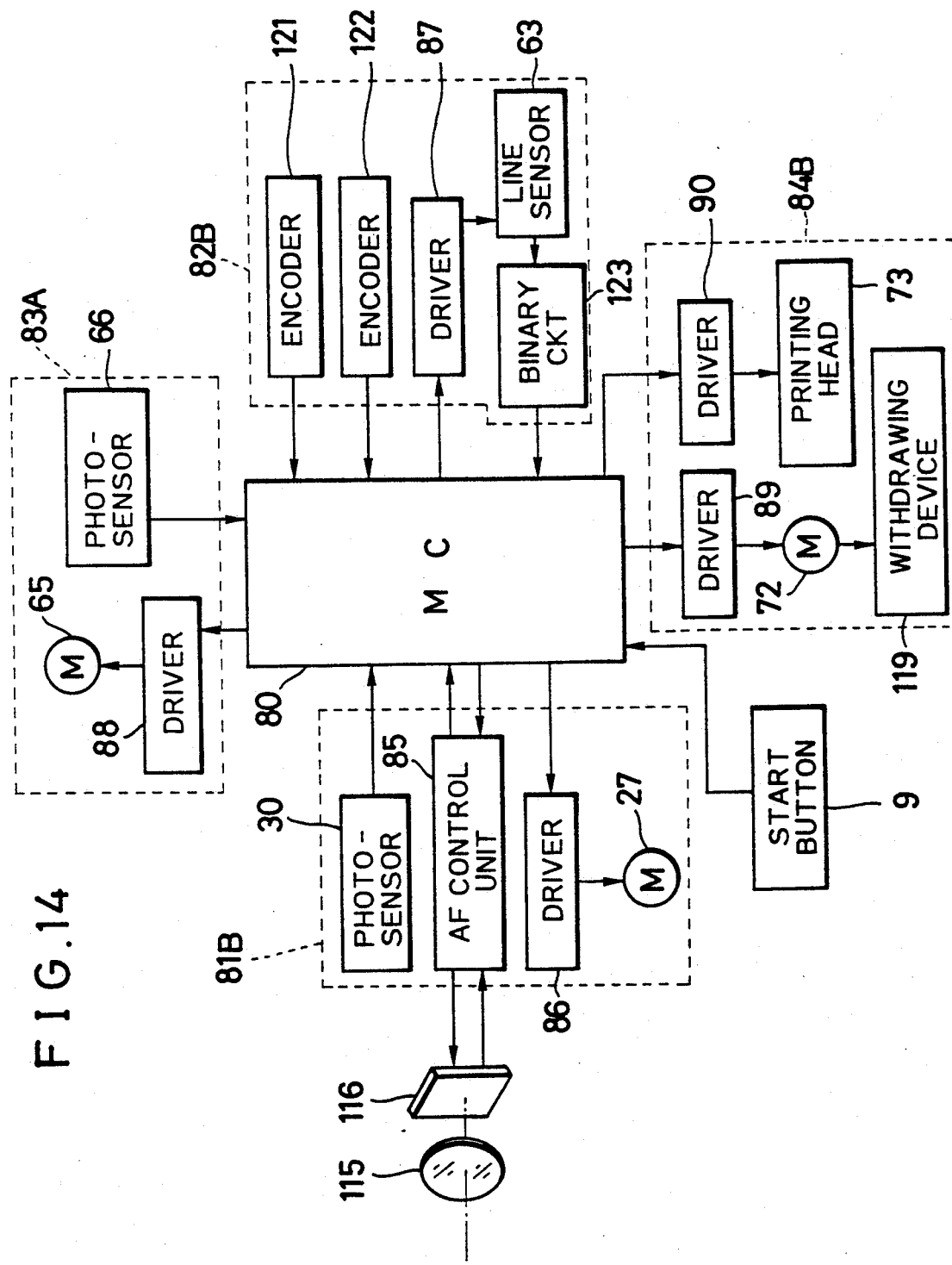
FIG. 14 is a block diagram showing the control circuitry incorporated in the electronic copying machine shown in FIG. 10.

After determining a desired size and position of frame image F1, F2 or F3 on the writing board 100, the release button 9 is pushed to make a hard copy. A hard copy is made in substantially the same manner as in the previously described embodiment. However, as shown in FIG. 14, electronic outputs from the line sensor 63 are converted to binary signals "0" or "1" by means of a binary transforming circuit 123 interconnected between the line sensor 63 of the image sensor control unit 82B, and MC 80.

Figure 18:
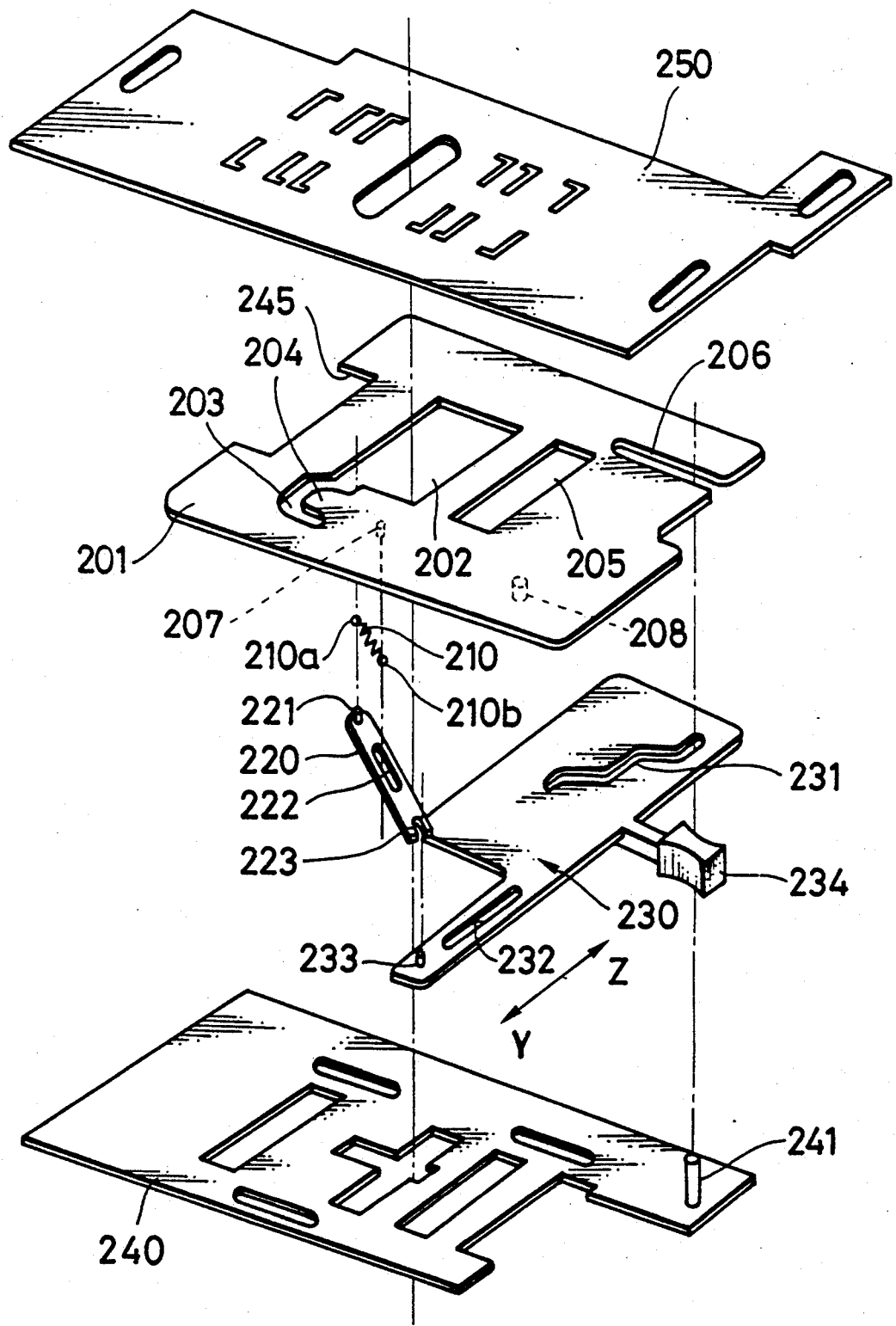
FIG. 18 is an exploded perspective view showing a variation of the frame projecting device.
Figure 19A:
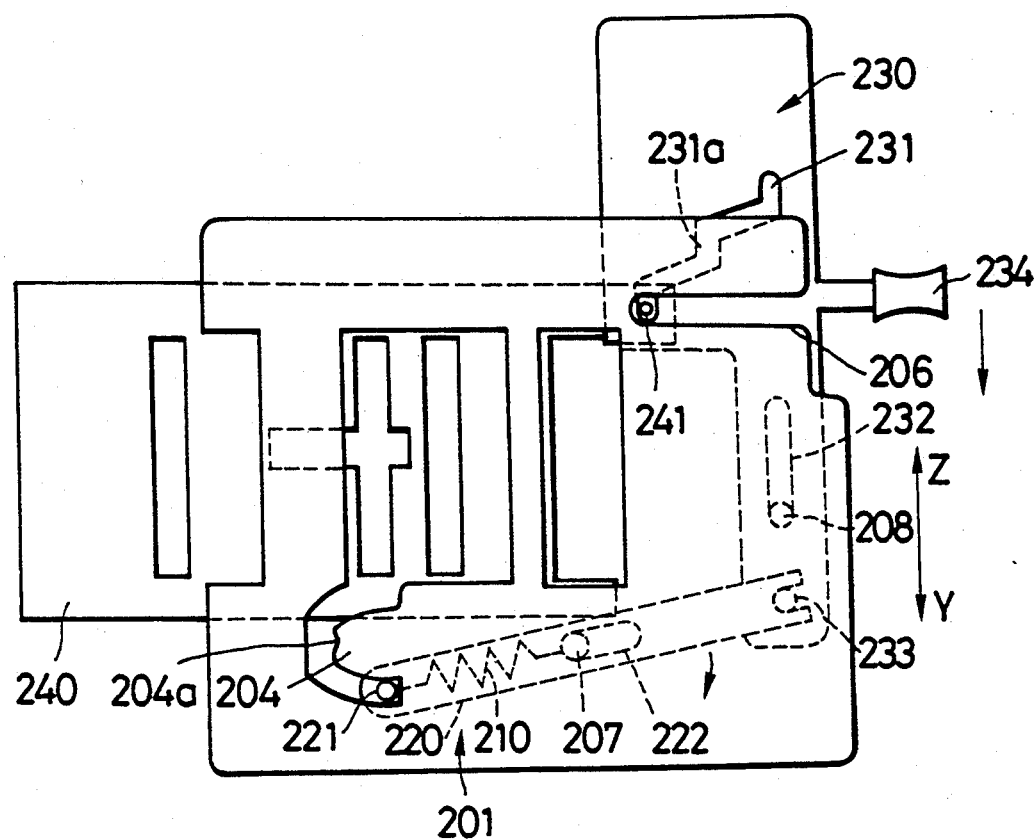
FIGS. 19A and 19B are plan views showing the operation of the frame projecting device of FIG. 18.
Figure 19B:
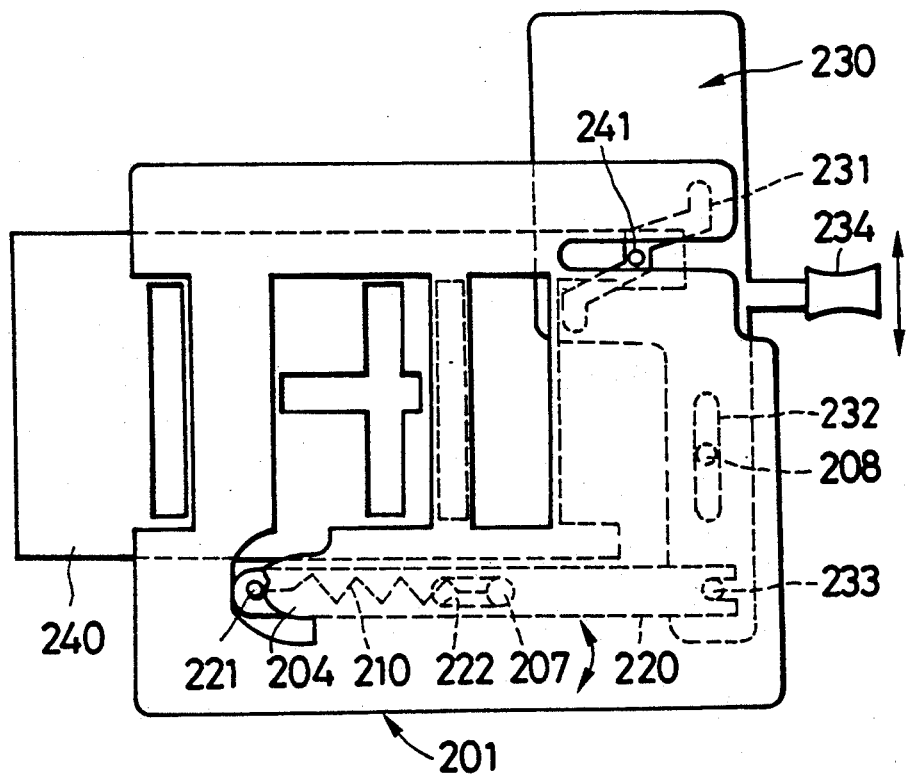

Referring to FIGS. 18 19A and 19B, a frame size change structure modified from that of FIGS. 10-13 is shown, which incorporates a click-stop mechanism. As shown, a supporting plate 201 is formed with an opening 202 with a generally L-shaped cutaway 203 extending therefrom defining a click projection 204, an elongated rectangular opening 205 and an open-ended slot 206. The supporting plate 201 is provided with two pins 207 and 208 extending downward from the under surface thereof. The pin 207 is connected with one end 210b of a coil spring 210. A click pin 221 at one end of a click lever 220 slidably contacts with the periphery of the click projection 204. The click lever 220 is formed with a center slot 222 intermediate its length and an open-ended slot 223 at the other end. The coil spring 210 is connected at the other end 210a to the click pin 221 of the click lever 220. The pin 207 is slidably received in the center slot 222.

An operating plate 230 is formed with a cam slot 231 and a straight slot 232 in which the pin 208 is slidably received. The operation plate 230 is provided with a pin 233 received in the open-ended slot 223. Either formed integrally with or secured to the operating plate 230 is a knob 234 which is grasped for slidably moving back and forth, in a Y-Z direction shown in FIG. 18, the operating plate 230.

A masking plate 240, which is similar in structure and operation to the masking plate 156 described above, is provided with a pin 241 extending into the open-ended slot 206 of the supporting plate 201 and passing through the cam slot 231. A frame size change plate 250 is similar in structure and operation to the frame size change plate 167 described above.

The supporting plate 201 and operating plate 230 are disposed between the masking plate 240 and frame size change plate 250 as shown in FIG. 19A wherein a large size slit frame is provided. When sliding the operating plate 230 in the Y direction, the cam slot 231 of the operating plate 230 move the pin 241 of the mask plate 240 in the open-ended slot 206 of the supporting plate 201, so as to shift the mask plate 240 to the right as viewed in FIG. 19A. At the same time, the click lever 220 turns in a clockwise direction about the pin 207 of the supporting plate 201 slidably received in the center slot 22 of the click lever 220. As the click lever 220 turns, the click pin 221 at the end of the click lever 220 moves along the periphery of the click projection 204 and enters a recess 204a, thereby clicking the click lever 220 so as to provide a medium size slit frame as shown in FIG. 19B. There, the pin 241 of the mask plate 240 is at the midway position 231a of the cam slot 231. Upon further sliding of the operating plate 230 in the Y direction, the mask plate 240 is slid to the right and clicked at a position where a small size slit frame is provided.

Figure 11:
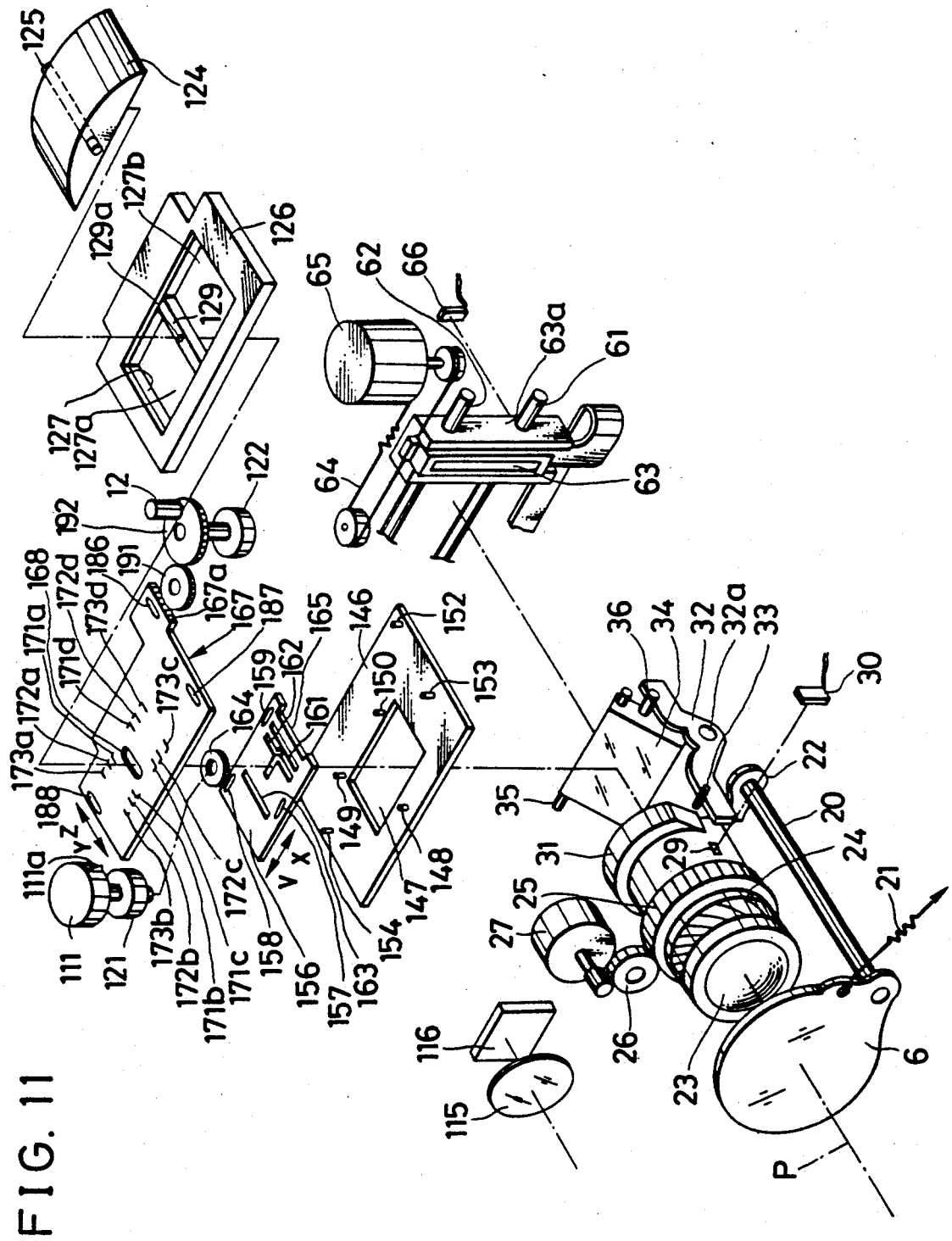
FIG. 11 is an exploded perspective view showing the interior mechanism of the electronic copying machine shown in FIG. 10.
Figure 20:
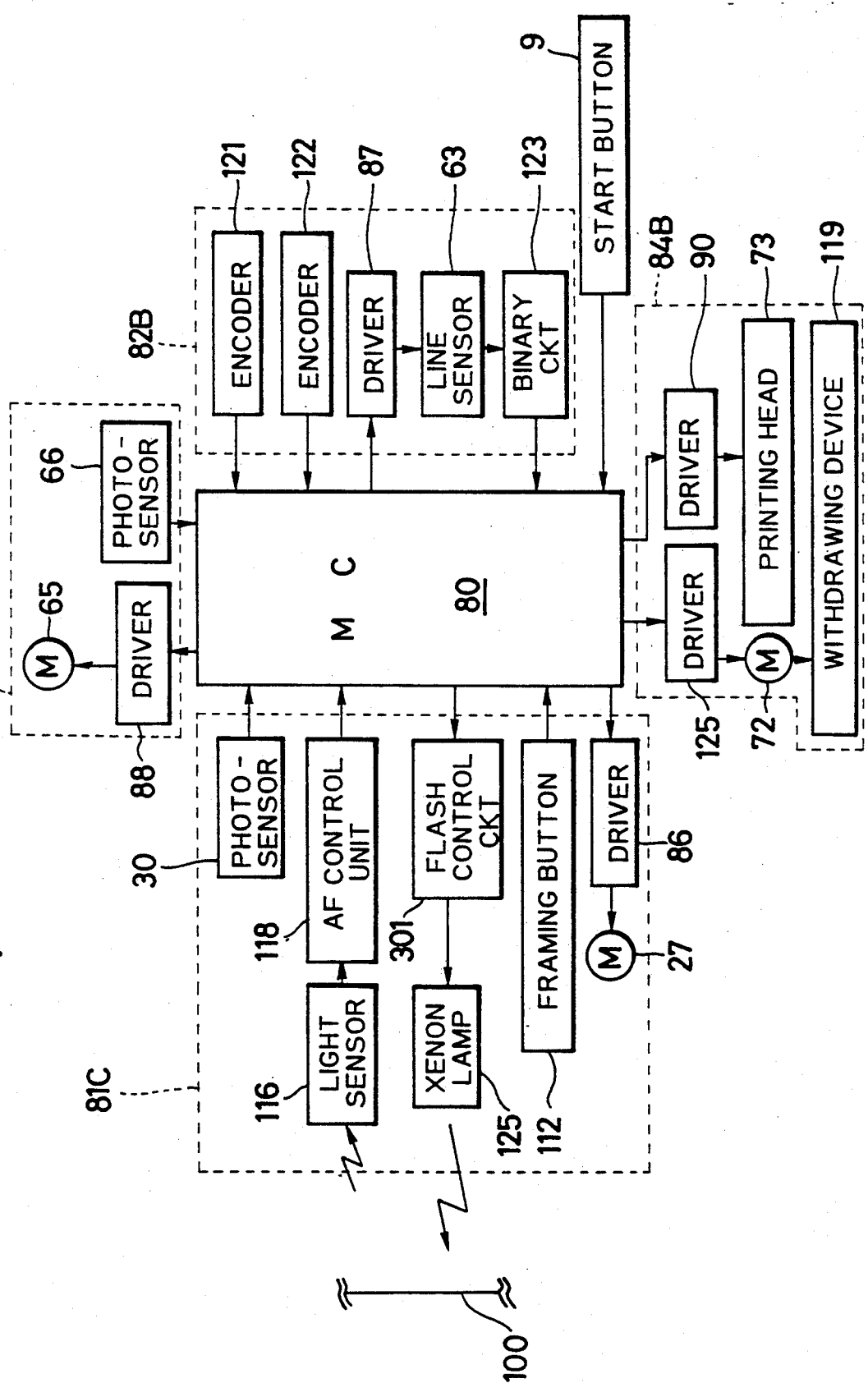
FIG. 20 is a block diagram showing the control circuitry incorporated in the electronic copying machine shown in FIG. 10.

Referring to FIG. 20, a control unit used in the electronic copying machine in accordance with the embodiment of the present invention shown in FIGS. 10 and 11 is shown, wherein a framing unit 81C is different from that of the control unit shown in FIG. 14. The framing unit 81C includes a xenon lamp control circuit 301 for controlling the firing of the xenon lamp 125 in addition to the components of the framing unit 81B shown in FIG. 14. The xenon lamp control circuit 301 is so structured as to cause the xenon lamp to intermittently fire at regular intervals for a certain time period when the MC 80 is provided with a framing signal from the framing button 112. The light from the xenon lamp 125 is partly reflected by the surface of the writing board 100 and then received by the light sensor 116 of the automatic control unit included in the framing unit 81C. The light sensor 116 provides the automatic focus control unit 118 with a signal when receiving the reflected light from the writing board 100. The automatic focus control nit 118 calculates the distance between the writing board 100 and focal plane of the taking lens 23 of the electronic copying machine and provides the MC 80 with a distance signal. In the same manner as in the previous embodiment, the MC 80 controls the number of rotations and the direction of rotation of the pulse motor 27.

Figure 21:
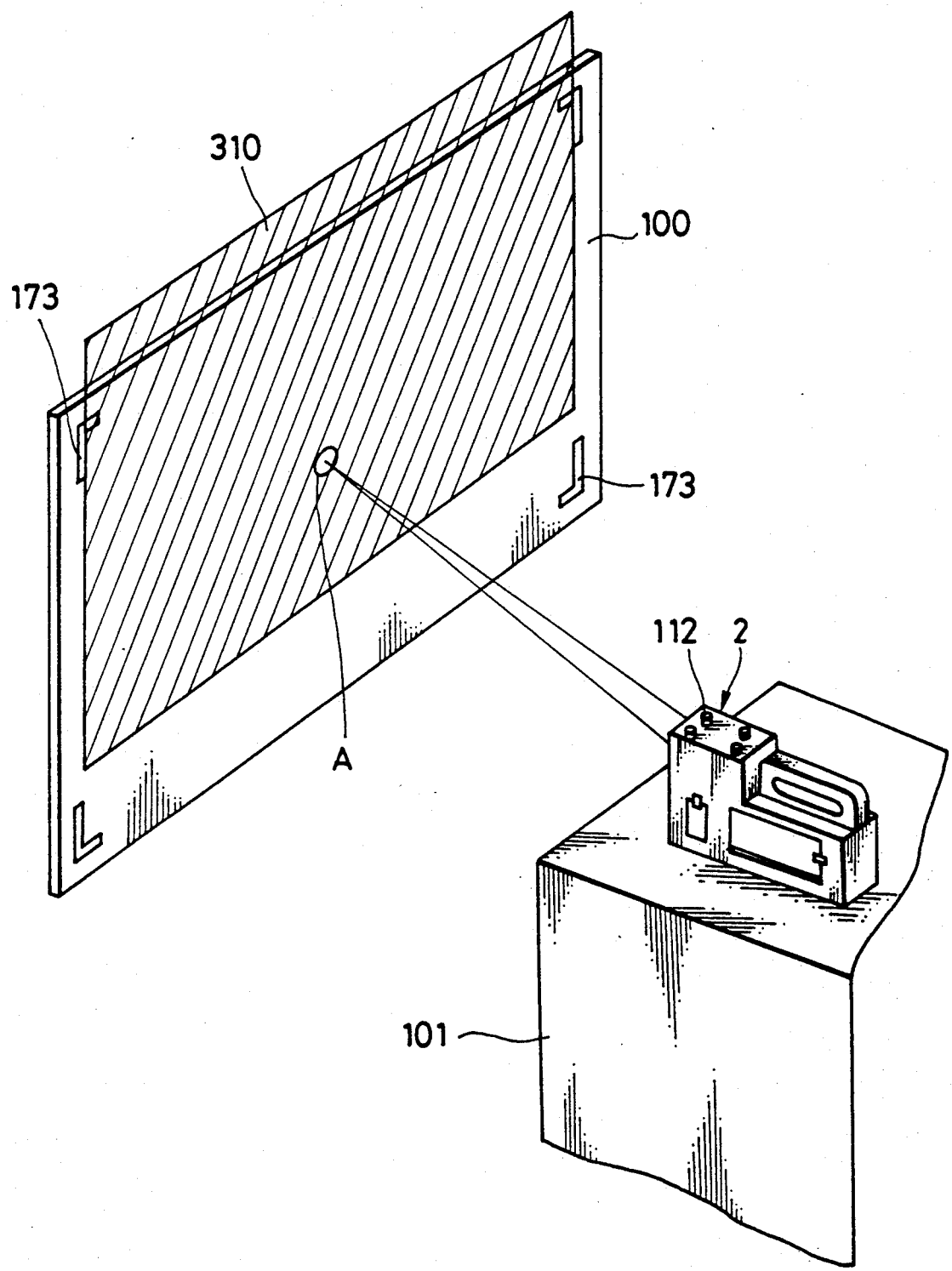
FIG. 21 is another illustration showing the electronic copying machine of FIG. 10 disposed on a table, and being used to make a hard copy of a remote surface.
Figure 22:
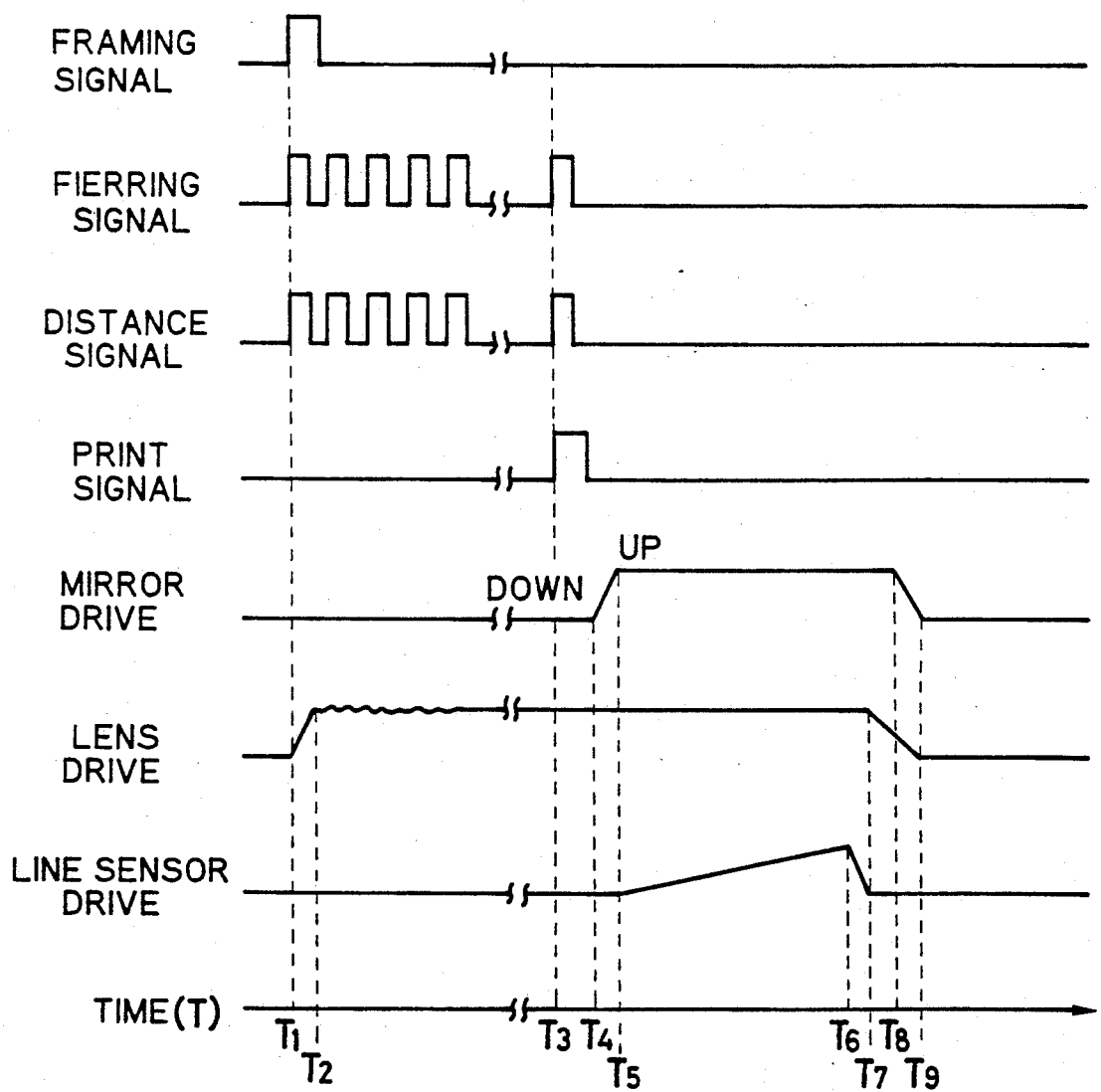
FIG. 22 is a time chart of signals provided by the electronic copying machine.

The operation of the electronic copying machine incorporating the control unit shown in FIG. 20 is described hereinafter with reference to a time chart shown in FIG. 22. In the case of making a hard copy of a subject 310 (shaded in FIG. 21), such as a map or graph, on the writing board 100, partly projecting out of the writing board 100, the electronic copying machine is put on the desk 101 in front of the writing board 100. The copy width change knob 111 is first turned to align the index 111a with any one of indication marks 111b so as stepwise to select a desired one of the three different copy widths. After turning on a power switch, when depressing the framing button 112, the MC 80 receives a framing signal from the framing button at a timing T1 and provides the xenon lamp control circuit 301 with trigger signals at regular intervals so as intermittently to fire the xenon lamp 125. It is desirable to preset the regular interval of firing to be as long as possible. However, because a longer-than-60-seconds regular interval of firing makes it quite troublesome to effect the framing operation, it is preferable to provide a regular firing interval of approximately 20 or 30 seconds for the reason of compactness of the power source unit. The light from the xenon lamp 125 passes through the frame slits of the frame size change plate 167 and is directed toward the writing board 100 by means of the reflex mirror 34. The light forms a focusing target mark A in the form of a spot on the writing board 100 as well as a desired slit frame, for example, 173. The target mark A and slit frame 173 are repeatedly projected onto the writing board 100 after the timing T1.

During the projecting of the focusing target mark A and slit frame 173 onto the writing board 100, the electronic copying machine is adjusted in position so as to place the width of the subject 310 within the slit frame 173. Then, to place the height of the subject 310 within the slit frame 173, the copy height adjusting knob 12 is turned in the clockwise direction as viewed in FIG. 11 to slide the frame size change plate 167 forwardly with respect to the electronic copying machine so as to shift the slit frame 173 upwardly on the writing board 100 until the lower slits of the slit frame 173 match the lower corners of the subject 310. It is preferred to project the slit frame 173 for approximately 5 to 12 seconds, more preferably 8 to 10 seconds, to preserve the life of the power source unit while allowing sufficient time for the frame adjusting operation. If the framing adjusting operation is not completed within the time, the framing button 112 is depressed again to project the focus target mark A and slit frame 173 for an additional interval.

The light projected repeatedly as a target mark A is partially reflected by the subject 310 and received by the light sensor 116 through the lens 115. A signal generated by the light sensor 116 is transmitted to the MC 80 as a distance signal by the automatic focus detecting unit 118. Then, the MC 80 actuates the pulse motor 27 in the counter clockwise direction at the timing T1 by means of the driver 86. At a timing T2, the pulse motor 27 drives the taking lens barrel 24 along the optical axis P to a position where the taking lens 23 focuses an image of the subject 310 onto the focal plane thereof. Since, upon the movement of the taking lens barrel 24, the slit frame 173 becomes gradually clear and is focused, it is visibly recognized that the taking lens 23 is placed in position to focus an image of the subject 310 onto the focal plane thereof. After the timing T2, the pulse motor 27 is driven with a distance signal intermittently provided by the MC 80. It is possible also to use an extra light source for projecting a target mark onto the writing board 100 for the focusing of the taking lens in the conventional manner, for the reason of decreasing the number of subject distance detections.

When the release button 9 is depressed at a timing T3, the MC 80 is provided with a print signal and thereby provides a firing signal so as once again to project the target mark A and slit frame 173. As a result of the projection of the target mark A, the automatic focus control unit 118 provides a distance signal which is actually used to set the taking lens barrel 24 in position at the timing T3. Thereafter, the reflex mirror 34 is actuated to swing up, being removed out of the optical path P of the taking lens 23 between timings T4 and T5, allowing an image of the subject 310 to be directed onto the focal plane of the taking lens 23 where the line sensor 63 moves. At the same time, the stepping motor 65 is actuated to rotate in the clockwise direction as viewed in FIG. 11, continuously moving the line sensor 63 in the focal plane of the taking lens 23 so as to scan the image projected onto the focal plane of the taking lens 23.

Between timings T5 and T6, the line sensor 63 provides the MC 80 with image signals at timings corresponding to output signals from the encoder 121. The MC 80, on one hand, selects image signals from the 1600 pixels of the line sensor 63 and provides the thermal printing head 73 of the printing unit 84B with the image signals line by line through the driver 90.

The MC 80, on the other hand, causes the stepping motor 72 through the driver 125 to rotate, thereby actuating the withdrawing device 119 comprising, for example, rollers so as to withdraw the thermosensitive copy paper 17. In this manner, an image of the writing board 100 is printed as a black and white image on the thermosensitive copy paper 17, line by line.

At a timing T6 when the line sensor 63 has scanned the whole predetermined area of the focal plane wherein the image of the subject 310 is projected, the MC 80 reverses the pulse motor 27 and step motor 65. When the step motor 65 is reversed in the counterclockwise direction, the line sensor 63 is returned to its initial position shown in FIG. 11. At a timing T7 when the line sensor 63 arrives at its initial position, it activates the photosensor 66 to provide the MC 80 with a return signal. Then, the MC 80 receiving the return signal stops the step motor 65 through the driver 88.

When the pulse motor 27 is reversed in the clockwise direction at the timing T7, the taking lens barrel 24 is turned in the clockwise direction through the gear 26 so as to return to its initial position. During the returning of the taking lens barrel 24, the reflex mirror 34 is returned into the optical axis P of the taking lens 23 beginning at a timing T8. At a timing T9, the taking lens barrel 24 returns to the initial position and activates the photosensor 30, thereby stopping the pulse motor 27.

Figure 23:
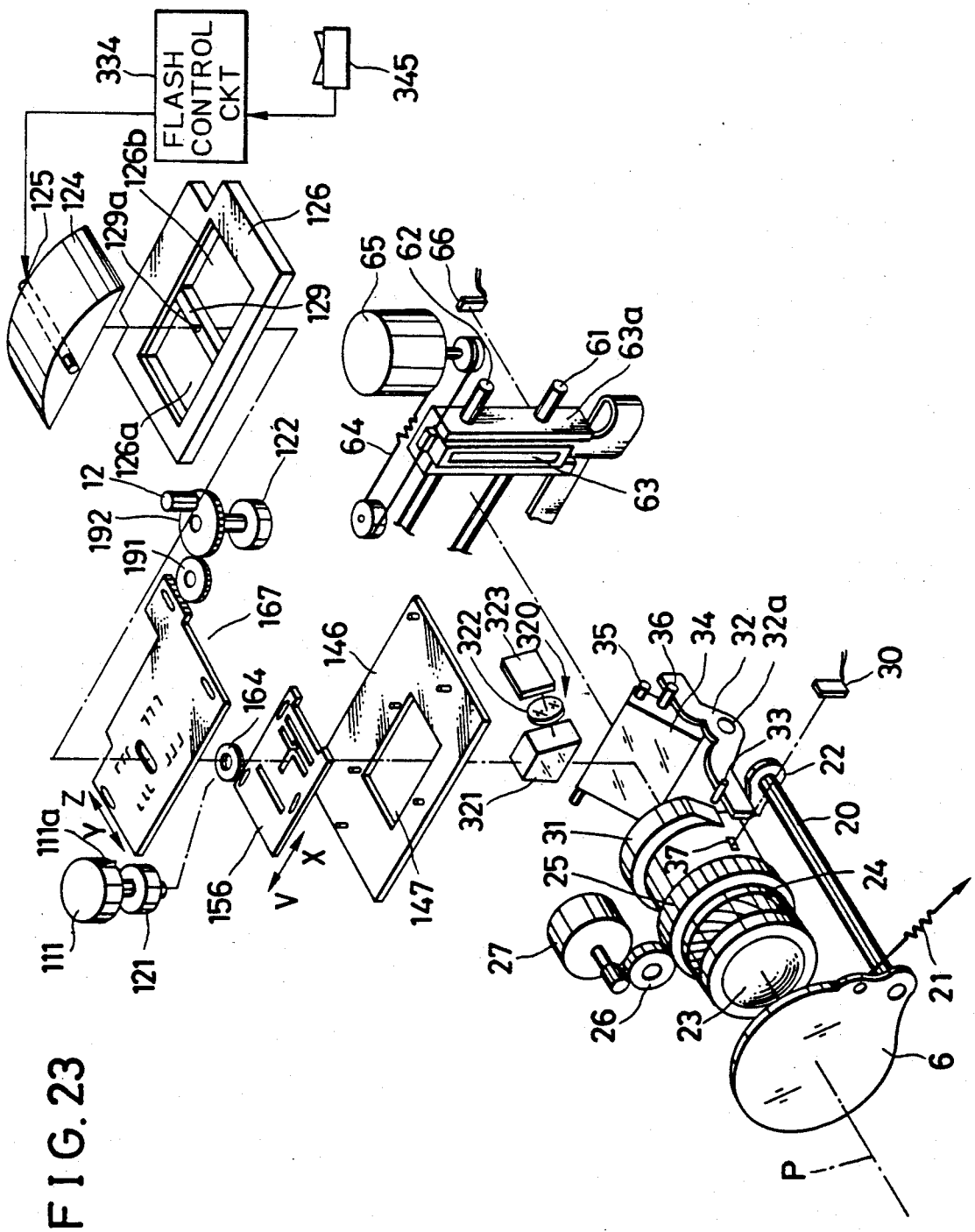
FIG. 23 is an exploded perspective view showing the interior mechanism of an electronic copying machine according to still another preferred embodiment of the present invention.
Figure 24:
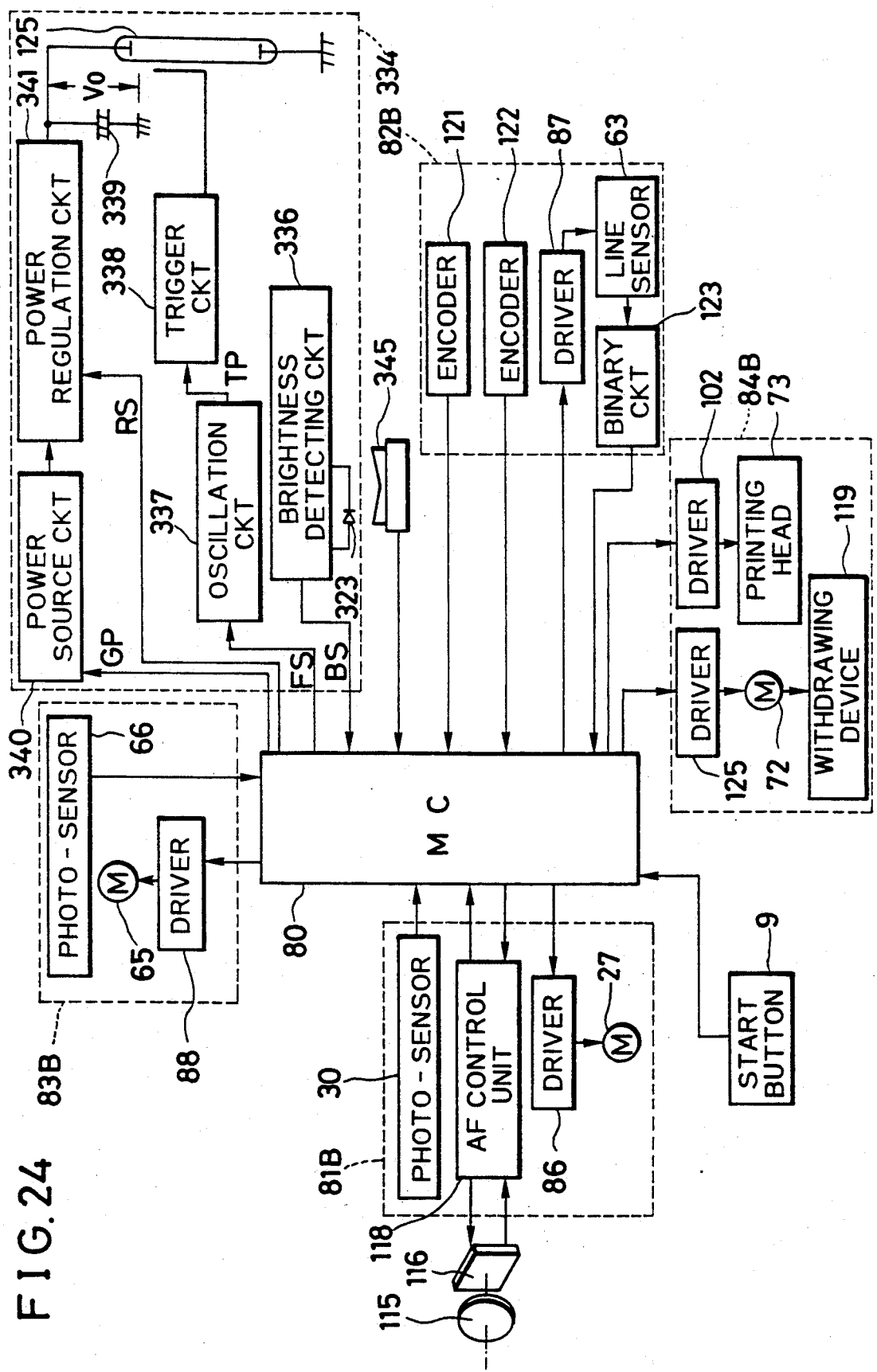
FIG. 24 is a block diagram showing the control circuitry incorporated in the electronic copying machine shown in FIG. 23.

Referring to FIGS. 23 to 26, an electronic copying machine in accordance with still another preferred embodiment of the present invention is shown, wherein a light measuring means is added to that of the previous embodiment shown in FIG. 11. As shown in FIG. 23, the light measuring device 320 includes a half mirror 321 disposed in the optical axis P between the reflex mirror 34 and aperture plate 146 of the viewfinder system for reflecting and directing a portion of the light reflected by the reflex mirror 34 to the upper right, and transmitting the remainder of the light reflected by the reflex mirror 34 directly toward the aperture plate 146. A silicon photodiode (SPD) 323 included in an electronic flash control unit 334 receives the reflected portion of the light from the half mirror 321 which is converged by means of a lens 322 disposed between the half mirror 321 and SPD 323. The SPD 323 provides a brightness detecting circuit 336 of the electronic flash control unit 334 with a digital brightness signal of a level corresponding to the amount of light incident thereon. The brightness detecting circuit 336 provides the MC 80 with a corresponding brightness signal.

The electronic flash control unit 334 includes a power source unit 340 which is actuated by a gate pulse GP from the MC 80, a main capacitor 339, and a power regulating circuit 341 for regulating the level of voltage to the main capacitor 339. The xenon lamp 125 is triggered with a triggering signal TP from a trigger circuit 338 connected to an oscillation circuit 337 to discharge the main capacitor 339 so as to actuate the flash.

The power regulating circuit 341 alters the level of voltage to the main capacitor 339 based on a regulation signal RS provided from the MC 80 according to brightness signals BS from the brightness detecting circuit 323. The oscillation circuit 337 maintains variable frequency oscillation according to a frequency regulation signal FS provided by the MC according to brightness signals BS from the brightness detecting circuit 323. The trigger circuit 338 outputs trigger pulses on a frequency of the vibration.

The electronic flash control unit 334 is actuated by turning on a flash switch 345. That is, upon the turning on of the flash switch 345, a gate pulse GP rises as is shown in FIG. 25 to actuate the power source circuit 340 to supply power to the power regulation circuit 341. The power regulation circuit 341 regulates the power according to a regulation signal RS provided by the MC 80 based on brightness signals BS from the brightness detecting circuit 323. If the writing board 100 is bright, and the level of photoelectric output from the SPD 323 is therefore high, then the MC 80 provides a regulation signal RS such that the level of voltage to the main capacitor 339 is increased to charge quickly the main capacitor 339 to the voltage $V_o$. The oscillation circuit 337, if the writing board 100 is bright, increasingly alters the frequency of oscillation according to the frequency regulation signal FS from the MC 80. The trigger circuit 338 then provides trigger pulses (TP) at intervals or frequency F1. Since the higher the frequency F1, the higher the voltage $V_o$ at which the main capacitor 339 discharges, the xenon lamp 125 is provided with a pulsed voltage $V_1$ at the frequency F1. Accordingly, the slit frame and target mark A are intermittently projected with a high brightness at a low frequency as apparent from FIG. 25

On the other hand, if the writing board 100 is dark, since the level of power to the main capacitor 339 is lowered and, therefore, the main capacitor 339 is charged slowly to the voltage $V_o$ and the oscillation circuit 337 provides an oscillation at a low frequency, the trigger circuit 338 outputs trigger pulses at intervals or frequencies F2 shorter than the frequency F1. Accordingly, the main capacitor 339 discharges at a low voltage $V_o$ and the xenon lamp 125 is intermittently provided with a pulsed voltage $V_2$ lower than the pulsed voltage $V_1$ at the frequency F2. Accordingly, the slit frame and target mark A are intermittently projected with a low brightness at a high frequency.

After focusing and framing the surface of the writing board 100 or a subject on the writing board 100 within the slit frame 171, 172 or 173 in the same manner as described in the previous embodiment, the flash switch 345 is turned off and the gate pulse GP falls down, thereby terminating the power supply to the main capacitor 339. As a result, the xenon lamp 125 stops flashing.

Figure 26:
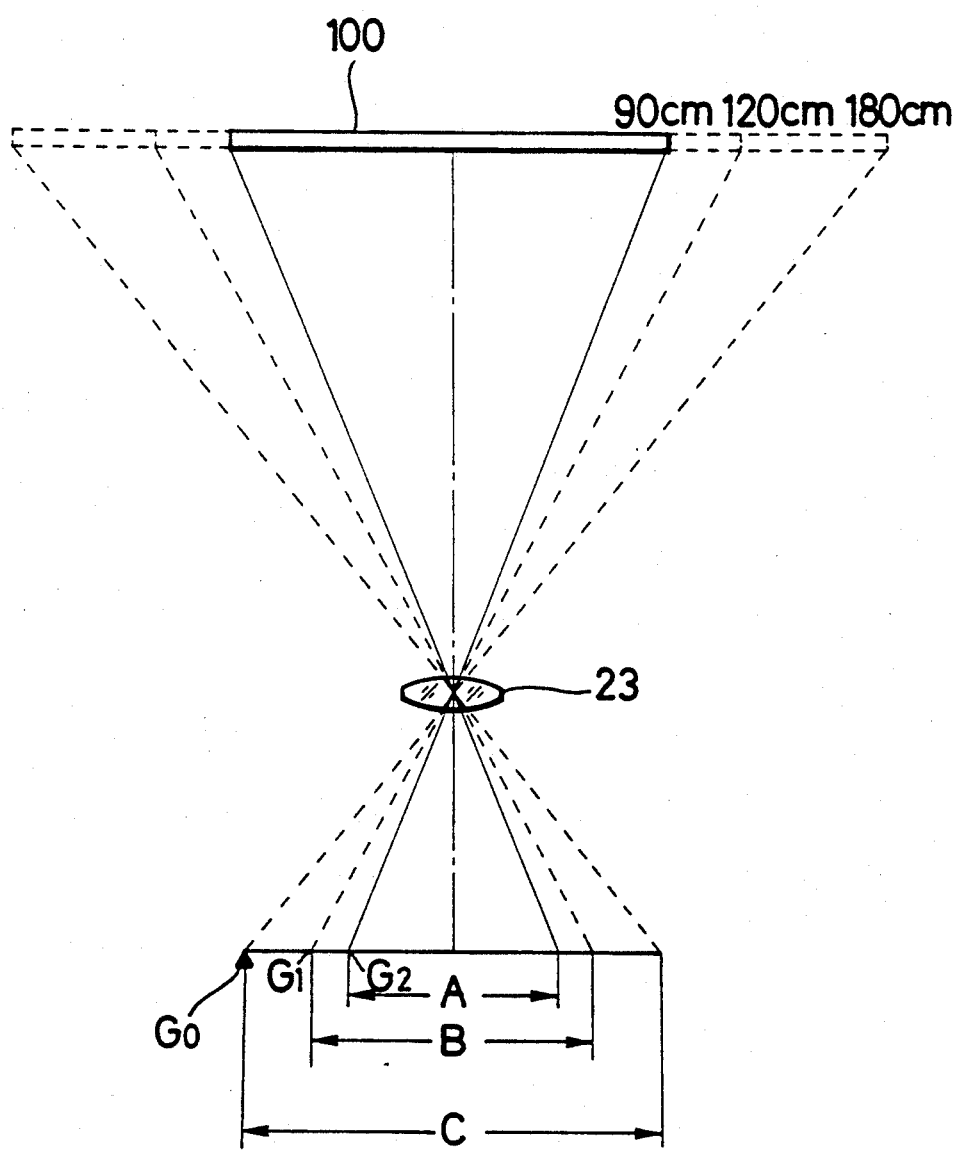
FIG. 26 is an illustration showing a positional relationship of a line sensor with respect to the remote surface.

In all of the above-described embodiments, the line sensor 63 is shifted to different start positions according to the width of the writing board to be copied, before making a hard copy of the writing board. That is, based on an output signal provided by the potentiometer 48 or the encoder 121 when the copy width change lever 11 or knob 111 is actuated, the line sensor 63 is positioned at a home position $G_o$ where the line sensor 63 is detected by the photosensor 66 when the width of the writing board 100 is 180 cm; at a position G1 when the width of the writing board 100 is 120 cm; or at a position G2 when the width of the writing board 100 is 90 cm, as shown in FIG. 26.

Figure 27:
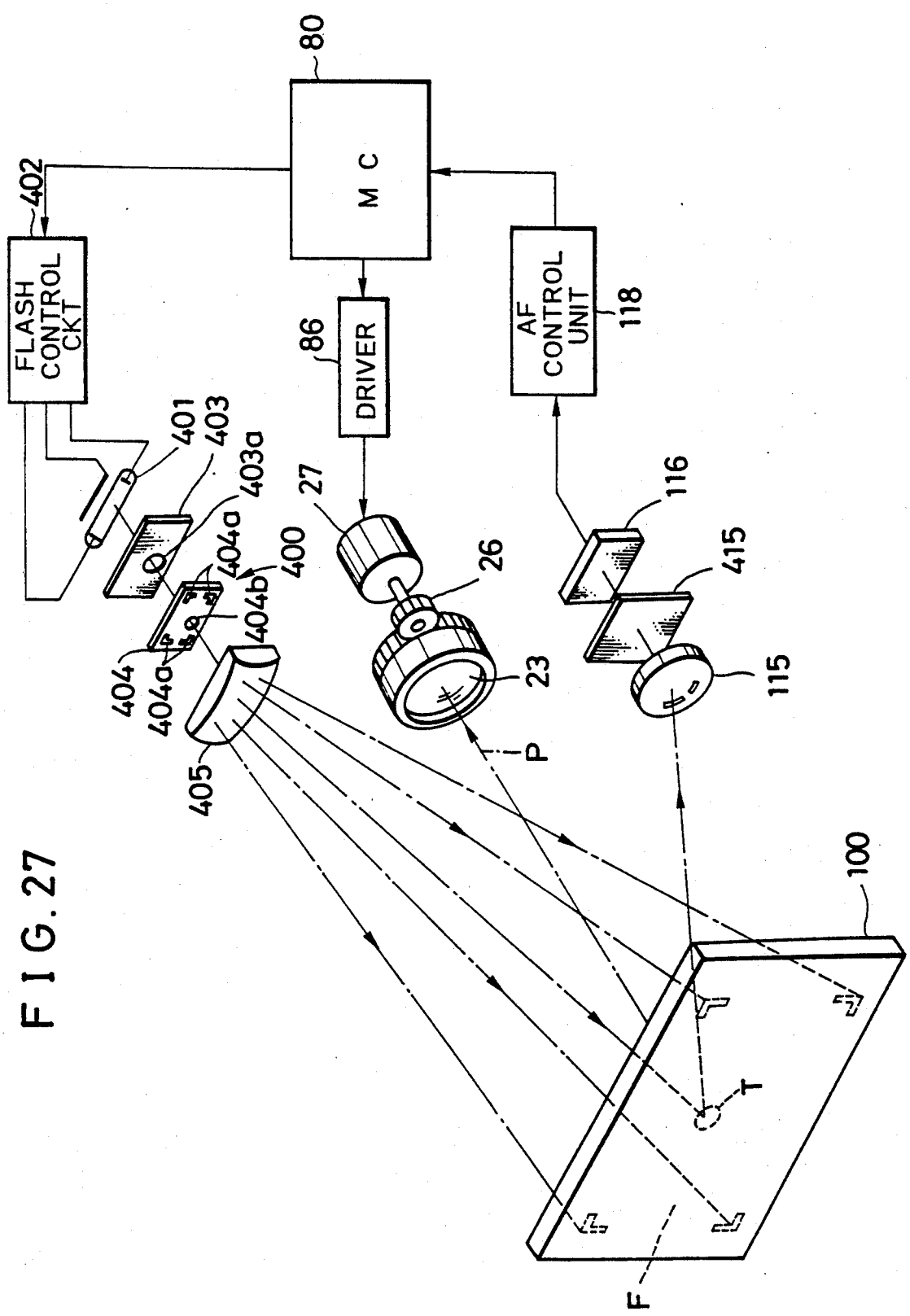
FIG. 27 is an exploded perspective view showing the interior mechanism of an electronic copying machine according to a further preferred embodiment of the present invention.

Whereas the above embodiments have been described with respect to an electronic copying machine adapted to project a slit frame and/or a focus target mark through the taking lens, it is nevertheless possible to project the slit frame and focus target mark other than through the taking lens. That is, as shown in FIG. 27, there is a slit frame projecting assembly 400 disposed substantially in parallel with the optical axis P of the taking lens 23 in the electronic copying machine. The slit frame projecting means 400 includes a flash lamp, such as a xenon lamp 401 controlled to fire intermittently by means of a flash control circuit 402. Disposed in front of the xenon lamp 401 is an infrared filter 403 with a visible light filtering area 403a formed at the center thereof. The infrared filter 403 removes infrared light and allows visible light to pass therethrough; the visible light filtering area 403a removes visible light and allows infrared light to pass therethrough. The visible light passed through the infrared filter 403 and the infrared light passed through the visible light filtering area 403a illuminate a frame slit plate 404 which is made of a light shielding material formed with four L-shaped slits 404a and a center hole 404b. The visible light passing through the four L-shaped slits of the frame slit plate 404 forms and projects an image of the L-shaped slits 404a onto the writing board 100, thereby defining a rectangular area F on the writing board 100. The infrared light passed through the visible light filtering area 403a of the infrared filter 403 forms and projects a red spot as a focus target mark T onto the writing board 100. A lens 405 is disposed in front of the frame slit plate 404 for directing a centerline L of light beam passing the center hole 404b of the frame slit plate 404 and the visible light filtering area 403a of the infrared filter 403 so that the centerline L intersects the optical axis P at the writing board 100.

Figure 28:
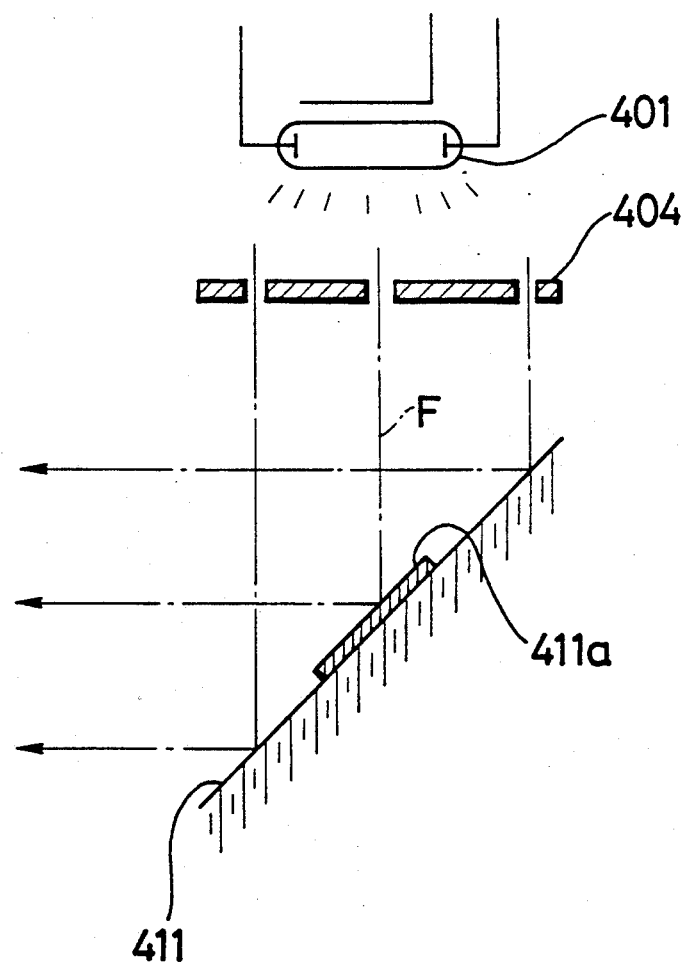
FIGS. 28 to 30 are illustrations showing variations of a slit frame projecting device of the electronic copying machine of FIG. 27.

As shown in FIG. 28, the infrared filter 403 can be replaced by a visible light reflective mirror 411 having an infrared light reflective mirror 411a centrally attached to the visible light reflective mirror 411. The visible light reflective mirror 411 is disposed at an angle of 45° with respect to the centerline F. In this case, the slit frame projecting assembly 400 is disposed substantially perpendicularly to the optical axis P of the taking lens 23 in the electronic copying machine.

On the side of the taking lens 23 opposite the side where the slit frame projecting assembly 400 is disposed, there is arranged the lens 115 and infrared light sensor 116 of the automatic focus detecting device. A visible light filter 415 is disposed between the lens 115 and infrared light sensor 116 of the automatic focus detecting device for allowing only the infrared light reflected from the writing board 100 to pass therethrough to the infrared light sensor 116. The infrared light sensor 116 provides the automatic focus control unit 118 with a photoelectric output of a level according to the distance between the writing board and the electronic copying machine, which is converted to a distance signal and transmitted in turn to the MC 80.

Figure 29:
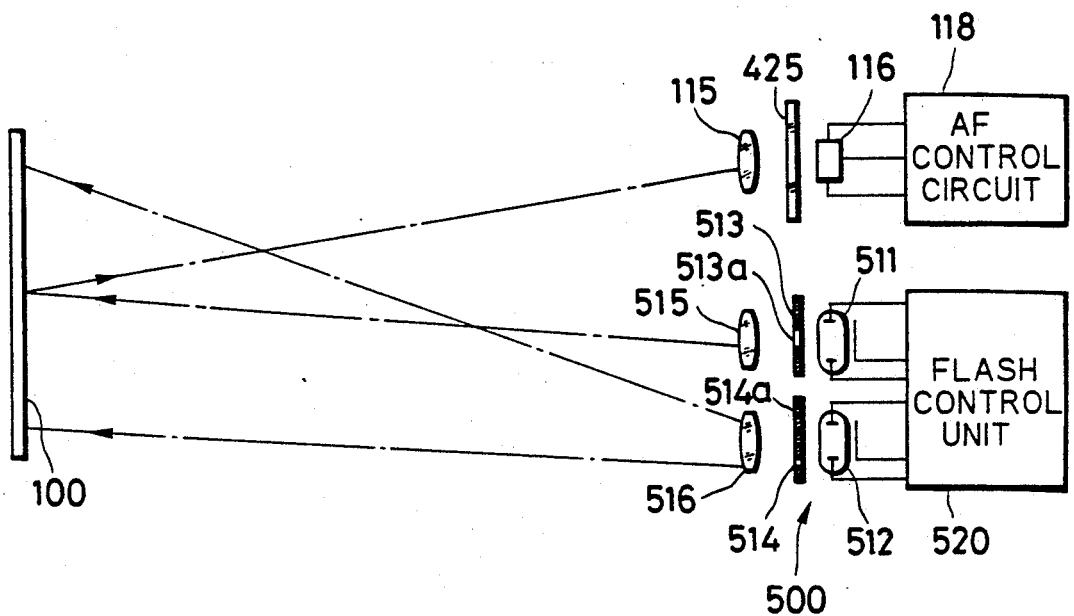
Figure 30:
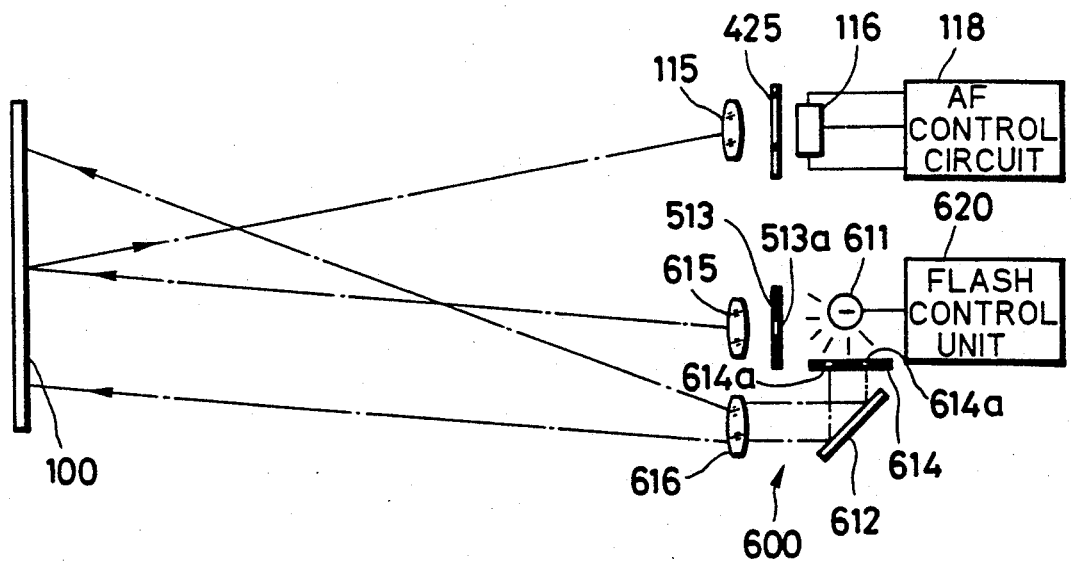

Referring to FIGS. 29 and 30, different types of slit frame projecting assemblies are shown. As shown in FIG. 29, the slit frame projecting assembly 500 has two lamps 511 and 512 connected to a common drive circuit 520 for illuminating a focus target mark plate 513 made of a light shielding plate with a central infrared light transmissive area 513a for allowing infrared light to pass therethrough and a frame slit plate 514 made of a light shielding plate formed with four frame slits 514a for defining a rectangular area, respectively. The infrared light passed through the center area 513a of the focus target mark plate 513 is focused as a focus target mark in the form of a spot on the writing board 100 by means of a lens 515. The visible light passed through the frame slits 514a of the frame slit plate 514 is focused as a frame defining corners on the writing board 100 by a lens 516.

On the other side of the focus target mark plate 513 from the frame slit plate 514 a visible light filter 425 is disposed between the lens 115 and infrared light sensor 116 of the automatic focus detecting device for allowing only the infrared light reflected from the writing board 100 to pass therethrough to the infrared light sensor 116.

Another modification of the slit frame projecting assembly 600 is shown in FIG. 30 wherein a common lamp 611 connected to a drive circuit 620 is provided for illuminating both the focus target mark plate 513 made of a light shielding material having a central infrared light transmissive area 513a for allowing infrared light to pass therethrough as well as a frame slit plate 614 made of a light shielding plate formed with four frame slits 614a for defining a rectangular area, respectively. The frame slit plate 614 is disposed at an angle of 90° with respect to the focus target mark plate 513. The visible light passed through the frame slits 614a of the frame slit plate 614 is reflected at an angle of 45° and directed toward the writing board 100 by means of a reflex mirror 612.

The infrared light passed through the central area 513a of the focus target mark plate 513 is focused as a focus target mark in the form of a spot on the writing board 100 by means of a lens 615. The visible light passed through the frame slits 614a of the frame slit plate 614 is, after being reflected by the reflex mirror 612, focused as a frame defining corners on the writing board 100 by a lens 616.

On the other side of the focus target mark plate 513, from the frame slit frame 614, a visible light filter 425 is disposed between the lens 115 and infrared light sensor 116 of the automatic focus detecting device for allowing only the infrared light reflected from the writing board 100 to pass therethrough to the infrared light sensor 116.

In the above modifications, since both the lamps 511 and 512 are fired by the common drive circuit 520 or both the focus target mark plate 513 and frame slit plate 614 are illuminated by the common lamp 611, the control unit can be simplified.

Although the present invention has been described in connection with various preferred embodiments thereof, it will be appreciated that these embodiments are provided solely for purposes of illustration, and should not be construed as limiting the scope of the invention. Other embodiments and applications of the invention will be readily apparent to those skilled in the art from reading the present specification and practicing the techniques described herein, without departing whatsoever from the scope and spirit of the appended claims.

What is claimed is:

1. An electronic copying machine for making a hard copy of images present on a vertical surface remote from the copying machine, comprising:

a taking lens system for forming an image of the remote surface, said taking lens system having an optical axis;

means for supporting said copying machine on a horizontal support surface with said optical axis horizontal;

a scanner adapted to scan the image to provide video signals representative of the scanned image;

means for forming an image of a frame bordering only a selected portion of said remote image which is eccentric to said optical axis, said frame image forming means being selectively movable to select positions of all sides of said frame image;

scanner activating means responsive to movement of said frame image forming means for activating only a selected portion of the scanner which is effective to produce a scanning area bordered by said frame image, said optical axis remaining horizontal regardless of a height of said scanning area; and a printing means for printing a centered image of changed aspect ratio from video signals from the scanning means within only the bordered scanning area.

2. An electronic copying machine as defined in claim 1, wherein said frame image forming means forms an image of a frame in a viewfinder.

3. An electronic copying machine for making a hard copy of images present on a vertical surface remote from the copying machine, comprising:

a taking lens system for forming an image of the remote surface, said taking lens system having an optical axis;

means for supporting said copying machine on a horizontal support surface with said optical axis horizontal;

a scanner adapted to scan the image to provide video signals representative of the scanned image;

a scanning area projector adapted to project onto the remote surface an image of a frame defining only a selected portion of an area of the remote surface within which the image of the remote surface is scanned by the scanning means, said selected portion being eccentric to said optical axis, said optical axis remaining horizontal regardless of a height of said selected portion scanned by the scanning means;

means movable to select positions of all sides of said frame image; and printing means responsive to movement of said movable means for printing a centered image of changed aspect ratio of only said eccentric selected portion of said area bordered by said frame image.

4. An electronic copying machine as defined in claim 3, wherein the projecting means is adapted to project the frame through the taking lens.

5. An electronic copying machine for making a hard copy of images present on a vertical surface remote from the copying machine, comprising:

a taking lens system for forming an image of the remote surface, said taking lens system having an optical axis;

means for supporting said copying machine on a horizontal support surface with said optical axis horizontal;

a scanner adapted to scan the image to provide video signals representative of the scanned image;

a scanning area projector adapted to project onto the remote surface an image of a frame defining only a selected portion of an area of the remote surface within which the image of the remote surface is scanned by the scanning means, said selected portion being eccentric to said optical axis, said optical axis remaining horizontal regardless of a height of said selected portion scanned by the scanning means;

means movable to select positions of all sides of said frame image;

said scanning area projector comprising:

a frame slit plate formed with a plurality of frame slits for defining different sizes of slit frame images;

a masking plate comprising said movable means for selectively masking the frame slits;

a source of illumination for illuminating the slit plate so as to project a frame image of a size selected by the masking plate onto the remote surface; and printing means responsive to movement of said movable means for printing a centered image of changed aspect ratio of only said eccentric selected portion of said area bordered by said frame image.

6. An electronic copying machine as defined in claim 5, wherein the scanning area projector includes a shifter adapted to shift the slit frame plate back and forth in a first direction and the masking plate back and forth in a second direction perpendicular to said first direction, so as to select a desired size of slit frame to be projected as a frame image.

7. An electronic copying machine for making a hard copy of images present on a vertical surface remote from the copy machine, comprising:

a taking lens system for forming an image of the remote surface, said taking lens system having an optical axis;

means for supporting said copying machine on a horizontal support surface with said optical axis horizontal;

a scanner adapted to scan the image to provide video signals representative of the scanned image;

a scanning area projector adapted to project onto the remote surface a frame defining only a selected portion of 94 area of the remote surface within which the image of the remote surface is scanned by the scanning means, said selected portion being eccentric to said optical axis, said optical axis remaining horizontal regardless of a height of said selected portion scanned by the scanning means, said machine further comprising:

a frame slit plate formed with a plurality of frame slits for forming different sizes of slit frame images, and a masking plate for selectively masking the frame slits;

a source of illumination for illuminating the slit plate so as to project a frame image of a size selected to the masking plate onto the remote surface for a predetermined time period;

start means for causing the scanner to scan the image of the remote surface to provide the video signal;

control means for deactivating the source of illumination when the start means is activated within said predetermined time period; and printing means for printing a centered image of only said eccentric selected portion of said area.

8. An electronic copying machine for making a hard copy of images present on a vertical surface remote from the copying machine, comprising:

a taking lens system for forming an image of the remote surface, said taking lens system having an optical axis;

means for supporting said copying machine on a horizontal support surface with said optical axis horizontal;

a scanner adapted to scan the image to provide video signals representative of the scanned image;

a scanning area projector adapted to project onto the remote surface a frame defining only a selected portion of an area of the remote surface within which the image of the remote surface is scanned by the scanning means, said selected portion being eccentric to said optical axis, said optical axis remaining horizontal regardless of a height of said selected portion scanned by the scanning means, said machine further comprising:

a slit frame projector including a slit plate formed with a frame slit and a source of illumination for projecting a slit frame image through said slit plate onto the remote surface, thereby defining said selected portion of the area within which the remote surface is copied;

a brightness detector for detecting a brightness of the remote surface;

control means for adjusting an amount of light emitted from the source of illumination according to the brightness of the remote surface detected by the brightness detector; and printing means for printing a centered image of only said eccentric selected portion of said area.

9. An electronic copying machine for making a hard copy of images present on a vertical surface remote from the copying machine, comprising:

a taking lens system for forming an image of the remote surface, said taking lens system having an optical axis;

means for supporting said copying machine on a horizontal support surface with said optical axis horizontal;

a line scanner adapted to scan the image line by line to provide video signals representative of the scanned line;

means for forming an image of a frame bordering only a selected portion of said remote image which is eccentric to said optical axis, said frame image forming means being selectively movable to select positions of all sides of said frame image;

said optical axis remaining horizontal regardless of a height of said frame image;

a setting means responsive to movement of said frame image forming means for defining a range of movement of the line scanner only within said frame image;

a shifter for shifting the line scanner to one end of the range of movement of the line scanner before scanning; and printing means for printing a centered image of changed aspect ratio of only said eccentric bordered portion of said area.

10. An electronic copying machine for making a hard copy of images present on a vertical surface remote from the copying machine, comprising:

a taking lens system for forming an image of the remote surface, said taking lens system having an optical axis;

means for supporting said copying machine on a horizontal support surface with said optical axis horizontally;

a scanner adapted to scan the image to provide video signals representative of the scanned image; and a scanning area projector adapted to project onto the remote surface a frame defining an area which is only a selected portion of the remote surface, within which selected portion the image of the remote surface is scanned by the scanning means, said selected portion being eccentric to said optical axis, said optical axis remaining horizontal regardless of a height of said selected portion scanned by the scanning means, said machine further comprising:

an automatic focusing system adapted automatically to focus the taking lens system to form a sharp image of the remote surface;

start means for causing the scanner to scan the image of the remote surface to provide the video signals;

control means for preventing the projector from projecting the frame image when the start means is operated; and printing means for printing a centered image of only said eccentric selected portion of said area.

11. An electronic copying machine for making a hard copy of images present on a vertical surface remote from the copying machine, comprising:

a housing;

a taking lens system having an optical axis for forming an image of the remote surface, said taking lens system being disposed on a front surface of said housing;

a scanner adapted to scan the image of the remote surface to provide video signal representative of the scanned image;

a viewfinder screen for observing the image of the remote surface, said viewfinder screen being disposed on an upper surface of said housing;

a mirror disposed behind said taking lens, for reflecting light passing through said taking lens toward said viewfinder screen;

means for selectively bordering an area of selectively variable size of the image to be printed, said bordered printing area being eccentric to said optical axis;

means for indicating the bordered printing area on said viewfinder screen in cooperation with said bordering means; and printing means responsive to said video signals for printing a centered hard copy of only the image in the bordered printing area.

12. An electronic copying machine as claimed in claim 11, wherein said indicating means is a framing mask means movable within the field of view of said viewfinder screen.

13. An electronic copying machine as claimed in claim 12, wherein said framing mask means comprises a first mask plate defining to and bottom margins of the image of the remote surface, and a second mask plate defining right and left margins of the image of the remote surface.

14. An electronic copying machine as claimed in claim 13, wherein said first mask plate has a viewing area that is transparent.

* * * * *